United States Patent
Takano

(10) Patent No.: US 10,425,949 B2
(45) Date of Patent: Sep. 24, 2019

(54) METHODS AND APPARATUS FOR COMMUNICATING RESOURCE INFORMATION WITH A TERMINAL DEVICE

(71) Applicant: Sony Corporation, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/913,031

(22) Filed: Mar. 6, 2018

(65) Prior Publication Data

US 2018/0199347 A1 Jul. 12, 2018

Related U.S. Application Data

(63) Continuation of application No. 15/332,397, filed on Oct. 24, 2016, now Pat. No. 9,936,511, which is a
(Continued)

(30) Foreign Application Priority Data

Jun. 27, 2012 (JP) .................. 2012-144048

(51) Int. Cl.
*H04W 72/04* (2009.01)
*H04W 16/16* (2009.01)
(Continued)

(52) U.S. Cl.
CPC ....... *H04W 72/0486* (2013.01); *H04L 1/0038* (2013.01); *H04L 5/00* (2013.01);
(Continued)

(58) Field of Classification Search
CPC ....... H04L 1/0038; H04L 5/00; H04L 5/0053; H04W 16/16; H04W 16/32;
(Continued)

(56) References Cited

U.S. PATENT DOCUMENTS

| 5,125,103 A | 6/1992 | Grube et al. |
| 7,548,758 B2 | 6/2009 | Periyalwar et al. |

(Continued)

FOREIGN PATENT DOCUMENTS

| CN | 101820584 A | 9/2010 |
| CN | 102017751 A | 4/2011 |

(Continued)

OTHER PUBLICATIONS

No Author Listed, Further Analysis on Time Domain Solutions in Het-Net, 3rd Generation Partnership Project, 3GPP TSG RAN WG1 Meeting #62, R1-104345 Madrid, Spain , Aug. 17, 2010, 4 p.
(Continued)

*Primary Examiner* — Quoc Thai N Vu
(74) *Attorney, Agent, or Firm* — Wolf, Greenfield & Sacks, P.C.

(57) ABSTRACT

Provided is a communication control device including a radio communication unit configured to perform radio communication with a plurality of terminal apparatuses of a primary system using communication resources of the primary system, and a generating unit configured to generate resource information for notifying a secondary system secondarily using the communication resources of available communication resources. The radio communication unit transmits the resource information generated by the generating unit through a downlink control channel including a common space that is decoded in common by the plurality of terminal apparatuses and a plurality of individual spaces that are decoded by only some of the plurality of terminal apparatuses.

17 Claims, 13 Drawing Sheets

Related U.S. Application Data continuation of application No. 14/406,364, filed as application No. PCT/JP2013/061275 on Apr. 16, 2013, now Pat. No. 9,516,639.

(51) Int. Cl.
*H04W 16/32* (2009.01)
*H04L 5/00* (2006.01)
*H04L 1/00* (2006.01)

(52) U.S. Cl.
CPC ............ *H04L 5/0053* (2013.01); *H04W 16/16* (2013.01); *H04W 16/32* (2013.01); *H04W 72/042* (2013.01); *H04W 72/048* (2013.01); *H04W 72/0453* (2013.01)

(58) Field of Classification Search
CPC ............ H04W 72/042; H04W 72/0453; H04W 72/048; H04W 72/0486; H04W 72/0426; H04W 72/1289; H04W 84/045
See application file for complete search history.

(56) References Cited

U.S. PATENT DOCUMENTS

| | | | |
|---|---|---|---|
| 8,160,101 B2 | 4/2012 | Kwak et al. | |
| 8,447,315 B2 | 5/2013 | Hakola et al. | |
| 8,452,240 B2 | 5/2013 | Takahashi | |
| 8,533,370 B2 | 9/2013 | Tanaka et al. | |
| 8,750,886 B2 | 6/2014 | Hakola et al. | |
| 8,767,616 B2 | 7/2014 | Choi et al. | |
| 8,811,359 B2 | 8/2014 | Wang et al. | |
| 8,830,928 B2 | 9/2014 | Iwamura et al. | |
| 8,848,591 B2 | 9/2014 | Liu et al. | |
| 8,995,942 B2 | 3/2015 | Watanabe | |
| 9,084,241 B2 | 7/2015 | Madan et al. | |
| 9,100,941 B2 | 8/2015 | Ratasuk et al. | |
| 9,480,053 B2 | 10/2016 | Takano et al. | |
| 9,516,639 B2 | 12/2016 | Takano | |
| 9,544,780 B2 | 1/2017 | Takano | |
| 9,585,176 B2 | 2/2017 | Li et al. | |
| 9,621,328 B2 | 4/2017 | Takano et al. | |
| 9,681,437 B2 | 6/2017 | Takano | |
| 9,807,738 B2 | 10/2017 | Takano et al. | |
| 9,825,751 B2 | 11/2017 | Takano et al. | |
| 9,900,887 B2 | 2/2018 | Takano | |
| 9,936,511 B2 | 4/2018 | Takano | |
| 9,986,552 B2 | 5/2018 | Takano | |
| 10,028,259 B2 | 7/2018 | Takano et al. | |
| 2007/0147310 A1 | 6/2007 | Cai | |
| 2009/0268680 A1 | 10/2009 | Nam et al. | |
| 2010/0120424 A1 | 5/2010 | Johansson et al. | |
| 2011/0076965 A1 | 3/2011 | Takahashi | |
| 2011/0081870 A1 | 4/2011 | Watanabe | |
| 2011/0106984 A1 | 5/2011 | Tanaka et al. | |
| 2011/0255425 A1 | 10/2011 | Pikkarainen et al. | |
| 2011/0255450 A1 | 10/2011 | Wang et al. | |
| 2011/0275379 A1 | 11/2011 | Hakola et al. | |
| 2011/0282989 A1 | 11/2011 | Geirhofer et al. | |
| 2012/0069803 A1 | 3/2012 | Iwamura et al. | |
| 2013/0100893 A1 | 4/2013 | Sawai | |
| 2013/0109384 A1 | 5/2013 | Abe et al. | |
| 2013/0155962 A1 | 6/2013 | Hakola et al. | |
| 2013/0242924 A1 | 9/2013 | Kim et al. | |
| 2014/0112263 A1* | 4/2014 | Lee .................. H04W 72/1289 370/329 |
| 2014/0307685 A1 | 10/2014 | Takano | |
| 2015/0110083 A1 | 4/2015 | Takano | |
| 2015/0117348 A1 | 4/2015 | Takano et al. | |
| 2015/0119064 A1 | 4/2015 | Takano | |
| 2015/0139108 A1 | 5/2015 | Takano | |
| 2015/0156006 A1 | 6/2015 | Takano et al. | |
| 2015/0195064 A1 | 7/2015 | Takano | |
| 2016/0080135 A1 | 3/2016 | Takano et al. | |
| 2016/0135157 A1 | 5/2016 | Takano | |
| 2017/0041937 A1 | 2/2017 | Takano | |
| 2017/0079023 A1 | 3/2017 | Takano et al. | |
| 2017/0164343 A9 | 6/2017 | Takano | |
| 2018/0049178 A1 | 2/2018 | Takano et al. | |
| 2018/0062822 A1 | 3/2018 | Takano et al. | |

FOREIGN PATENT DOCUMENTS

| | | | |
|---|---|---|---|
| EP | 2 391 168 A1 | 11/2011 | |
| EP | 2 566 213 A1 | 3/2013 | |
| EP | 2 592 857 A1 | 5/2013 | |
| JP | 2009-527940 A | 7/2009 | |
| JP | 2010-504048 A | 2/2010 | |
| JP | 2010-533443 A | 10/2010 | |
| JP | 2011-142599 A | 7/2011 | |
| JP | 2011-166650 A | 8/2011 | |
| JP | 2012-005086 A | 1/2012 | |
| JP | 2012-034326 A | 2/2012 | |
| JP | 2012-080509 A | 4/2012 | |
| JP | 2012-119827 A | 6/2012 | |
| JP | 2013-530570 A | 7/2013 | |
| WO | WO 2009/130592 A1 | 10/2009 | |
| WO | WO 2010/027308 A1 | 3/2010 | |
| WO | WO 2010/084987 A1 | 7/2010 | |
| WO | WO 2010/143445 A1 | 12/2010 | |
| WO | WO 2011/130626 A1 | 10/2011 | |
| WO | WO 2011/136334 A1 | 11/2011 | |
| WO | WO 2011/162395 A1 | 12/2011 | |
| WO | WO-2012026857 A1 * | 3/2012 | ........ H04W 72/0453 |
| WO | WO 2012/067006 A1 | 5/2012 | |
| WO | WO 2012/067430 A2 | 5/2012 | |

OTHER PUBLICATIONS

No Author Listed, Analysis of Time-Partitioning Solution for Control Channel, 3rd Generation Partnership Project, 3GPP TSG RAN WG1 Meeting #61bis. R1-103494, Dresden, Germany, Jun. 22, 2010, 3p.

No Author Listed, ABS signaling considerations for LTE-A TDD, 3rd Generation Partnership Project, 3GPP TSG RAN WG1 Meeting #63, R1-105940, Jacksonville, FL, Nov. 11, 2010, 4p.

Extended European Search Report dated Aug. 3, 2018 in connection with European Application No. 18160152.7.

* cited by examiner

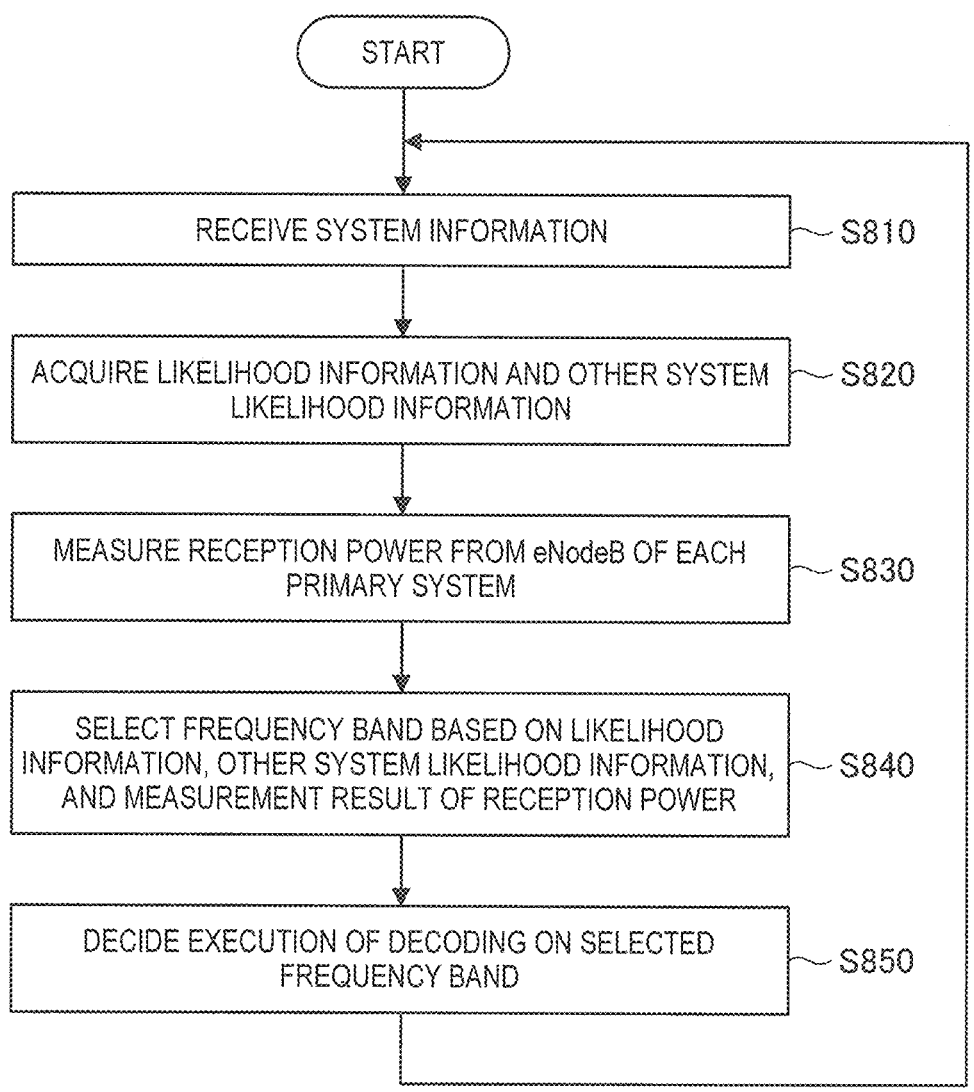

METHODS AND APPARATUS FOR COMMUNICATING RESOURCE INFORMATION WITH A TERMINAL DEVICE

CROSS-REFERENCE TO RELATED APPLICATIONS

This application is a continuation of and claims the benefit under 35 U.S.C. § 120 of U.S. patent application Ser. No. 15/332,397, titled "METHODS AND APPARATUS FOR COMMUNICATING RESOURCE INFORMATION WITH A TERMINAL DEVICE," filed on Oct. 24, 2016, which is a continuation of U.S. patent application Ser. No. 14/406,364, titled "METHODS AND APPARATUS FOR COMMUNICATING RESOURCE INFORMATION WITH A TERMINAL DEVICE," filed on Dec. 8, 2014, which is a National Stage of International Application No. PCT/JP2013/061275, filed in the Japanese Patent Office as a Receiving Office on Apr. 16, 2013, which claims priority to Japanese Patent Application Number JP 2012-144048, filed in the Japanese Patent Office on Jun. 27, 2012, each of which is hereby incorporated by reference in its entirety.

TECHNICAL FIELD

The present disclosure relates to a communication control device, a communication control method, and a communication device.

BACKGROUND ART

High speed cellular radio communication schemes such as Long Term Evolution (LTE) and WiMAX have been put into practical use in recent years, remarkably increasing communication rates of radio communication services for mobile users. Furthermore, the introduction of the fourth generation cellular radio communication schemes such as LTE-Advanced (LTE-A) will be expected to increase communication rates much more.

Meanwhile, more and more applications that require high data rates are used with a rapid increase in the number of mobile users. As a result, the development of cellular radio communication schemes has not yet satisfied all the needs of mobile users. Accordingly, techniques for effective use of frequency resources are developed in order to maintain or increase communication rates.

For example, Patent Literature 1 discloses a technique for helping share communication resources between a plurality of secondary communication services.

CITATION LIST

Patent Literature

Patent Literature 1: JP 2012-34326A

SUMMARY OF INVENTION

Technical Problem

However, for example, when a communication device of a secondary system checks resource blocks in an idle state in an LTE radio communication system serving as a primary system, a large load typically occurs in the communication device of the secondary system. More specifically, since the communication device of the secondary system has to perform blind decoding on all control channel elements (CCEs) included in a physical downlink control channel (PDCCH), a large load occurs in the communication device of the secondary system.

In this regard, it is desirable to provide a mechanism capable of reducing a load occurring when the secondary system checks communication resources of the primary system in the idle state.

Solution to Problem

According to the present disclosure, there is provided a communication control device including a radio communication unit configured to perform radio communication with a plurality of terminal apparatuses of a primary system using communication resources of the primary system, and a generating unit configured to generate resource information for notifying a secondary system secondarily using the communication resources of available communication resources,. The radio communication unit transmits the resource information generated by the generating unit through a downlink control channel including a common space that is decoded in common by the plurality of terminal apparatuses and a plurality of individual spaces that are decoded by only some of the plurality of terminal apparatuses.

Further, according to the present disclosure, there is provided a communication control method including performing radio communication with a plurality of terminal apparatuses of a primary system using communication resources of the primary system, generating resource information for notifying a secondary system secondarily using the communication resources of available communication resources, and transmitting the generated resource information through a downlink control channel including a common space that is decoded in common by the plurality of terminal apparatuses and a plurality of individual spaces that are decoded by only some of the plurality of terminal apparatuses.

Further, according to the present disclosure, there is provided a communication device including a radio communication unit configured to receive resource information for notifying a secondary system secondarily using communication resources of a primary system of available communication resources through a downlink control channel including a common space that is decoded in common by a plurality of terminal apparatuses of the primary system and a plurality of individual spaces that are decoded by only some of the plurality of terminal apparatuses, and a control unit configured to cause the radio communication unit to perform radio communication using the available communication resources based on the resource information acquired by decoding of the downlink control channel.

Advantageous Effects of Invention

As described above, according to the present disclosure, it is possible to reduce a load occurring when a secondary system checks communication resources of a primary system in an idle state.

BRIEF DESCRIPTION OF DRAWINGS

FIG. 13 is a flowchart illustrating an exemplary schematic flow of a communication control process of a home eNodeB side of a secondary system according to a modified example of the present embodiment.

DESCRIPTION OF EMBODIMENTS

Figure 1:
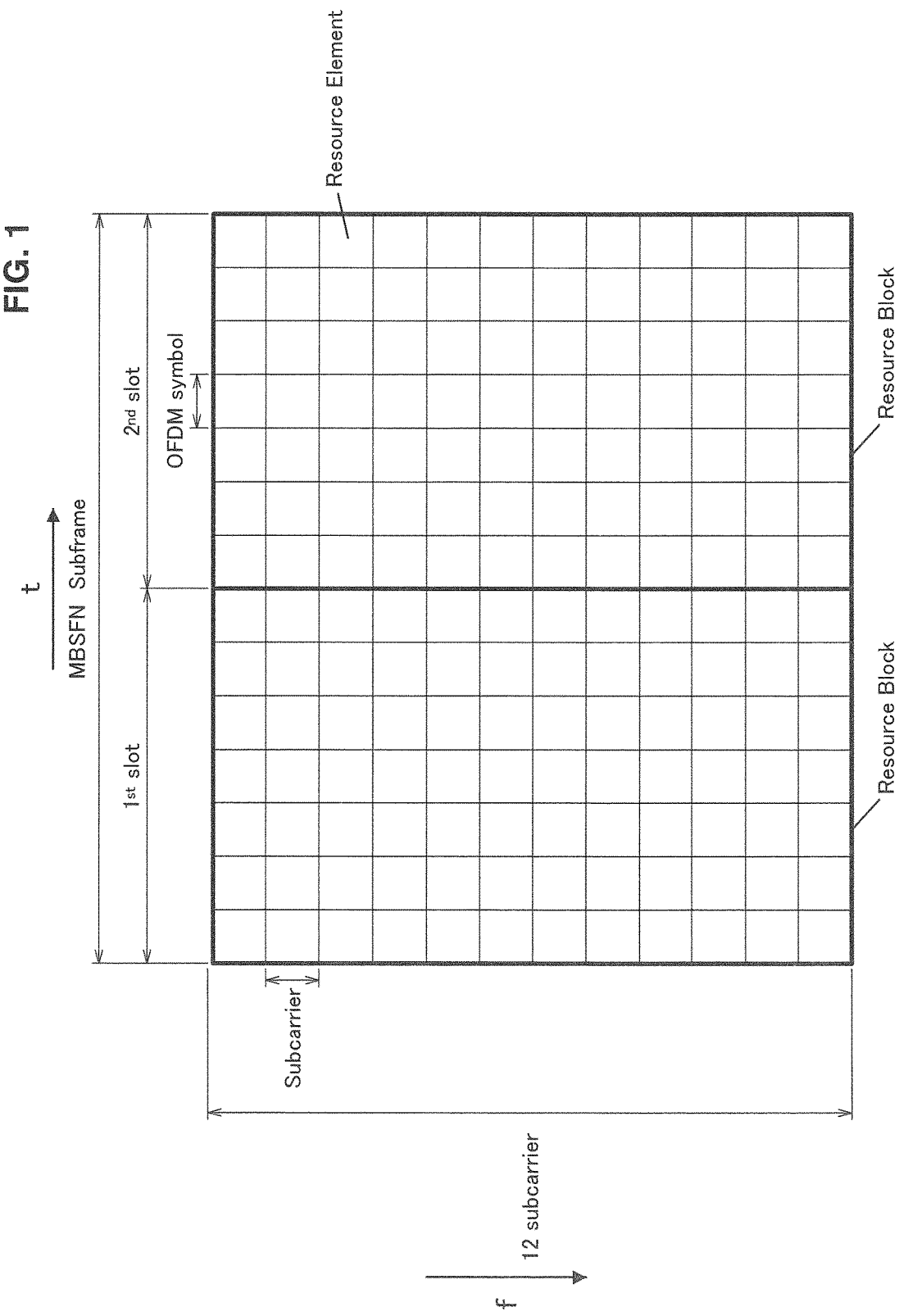
FIG. 1 is an explanatory diagram for describing a format of a downlink resource block in LTE.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will proceed in the following order.
1. Introduction
1.1. Technical field of effective use of frequency resources
1.2. Frequency secondary use for effectively using frequency resources in idle state
1.3. Primary system and secondary system
1.4. Technical problems
2. Schematic configurations of primary system and secondary system
3. Configurations of respective devices
3.1. Configuration of eNodeB
3.2. Configuration of home eNodeB
4. Processing flow
5. Modified example
5.1. Configuration of eNodeB
5.2. Configuration of home eNodeB
5.3. Processing flow
6. Conclusion <<1. Introduction>>

First, the technical field of effective use of frequency resources, a frequency secondary use for effectively using frequency resources in a temporally or spatially idle state, a primary system and a secondary system, a resource block in LTE, and a technical problem will be described.

<1.1. Technical Field for Effective Use of Frequency Resource>

First of all, the technical field for effective use of a frequency resource will be described. For example, the following technical fields are representative of the technical field for effective use of a frequency resource.

frequency sharing within a single operator
frequency sharing between different operators
frequency secondary use for effectively using a frequency resource in a temporally or spatially idle state
real-time auction of a frequency resource in an idle state First, frequency sharing within a single operator is a technique of improving utilization efficiency of a frequency resource with the frequency resource leased between communication systems of the same operator in different communication schemes. The different communication schemes are Wideband Code Division Multiple Access (W-CDMA) and Long Term Evolution (LTE) as an example. For example, a rapidly increased traffic volume in a LTE network and a small traffic volume in a W-CDMA network temporarily allow a part of the frequency resource in the W-CDMA network to be used in the LTE network. As a result, it becomes possible to increase the communication capacity of the LTE network, which leads to an increase in the total traffic volumes of both W-CDMA network and LTE network. In other words, it becomes possible to increase the number of terminal apparatuses that can be accommodated in both W-CDMA network and LTE network.

Second, frequency sharing between different operators is a technique of improving utilization efficiency of a frequency resource with the frequency resource leased between communication systems of the different operators. It is assumed in this frequency sharing that different operators (such as an operator A and an operator B) are concurrently providing radio communication services in the same area. For example, the operator A and the operator B each provide a radio communication service of LTE. For example, a rapidly increased traffic volume in a LTE network of the operator B and a small traffic volume in a LTE network of the operator A temporarily allow a part of the frequency resource in the LTE network of the operator A to be used in the LTE network of the operator B. As a result, it becomes possible to increase the communication capacity of the LTE network of the operator B, which leads to an increase in the traffic volume in the LTE network of the operator B.

Third, frequency secondary use for efficiently using a frequency resource in a temporally or spatially idle state is a technique of improving utilization efficiency of a frequency resource with the frequency resource leased between a primary system and a secondary system. The primary system is also referred to as primary system. The secondary system is also referred to as secondary system. The primary system is a main system having priority. For example, the primary system is a radio communication system of LTE. For example, the secondary system is a dedicated radio communication system of LTE including a radio LAN system or a home eNodeB and a User Equipment (UE) in the neighborhood thereof. For example, when the primary system has a frequency resource unused, the secondary system temporarily uses this frequency resource.

Fourth, the real-time auction of frequency resources in the idle state is a technique of lending frequency resources to an operator who desires to use the frequency resources in the idle state through an auction.

The present disclosure focuses on the frequency secondary use for effectively using the frequency resources in the temporally or spatially idle state. In the present disclosure, for example, a technique necessary when this technique is applied in an LTE platform will be described.

<1.2. Frequency Secondary Use for Effectively Using Frequency Resources in Idle State>

(Premise of Frequency Secondary Use in LTE)

In the LTE radio communication system, resource blocks (RBs) are uplink and downlink scheduling units. The resource blocks are communication resources of 12 sub carriers×7 OFDM symbols. The communication resources can be divided in the frequency direction and the time direction as described above. User equipment (UE) can use communication resources of resource block units. Further, downlink and uplink communication resources are allocated to the UE in units of resource blocks In the LTE radio communication system, not all resource blocks are necessarily used all the time. In other words, when the number of UEs in a cell is small or when uplink or downlink traffic of the UE is small, there are resource blocks in the idle state. When the communication resources in the idle state are released by the primary system and effectively used by the secondary system, throughput can be improved.

(Units of Communication Resources to be Effectively Used)

As described above, the resource blocks that are the communication resources of 12 sub carriers×7 OFDM symbols have been described as the communication resources in the idle state. The resource block is a minimum scheduling unit. As a first example, units of the communication resources in the idle state released to the secondary system are the resource blocks. As a second example, units of the communication resources in the idle state released to the secondary system are subframes. In other words, communication resources of a frequency band (for example, component carrier)×1 millisecond (ms) are released to the secondary system.

The frequency at which release of communication resources is decided is considered to differ according to units of released communication resources in the idle state.

For example, when units of released communication resources in the idle state are resource blocks, the frequency at which the release is decided may be very high. In other words, the communication resources in the idle state may be very dynamically released. This is because, since a UE using a resource block is decided for each resource block, a resource block directly after a resource block in the idle state may not be in the idle state. Thus, for example, the frequency at which the release of the resource block is decided is 1 ms (a length of a subframe).

Meanwhile, for example, when units of released communication resources in the idle state are subframes, the frequency at which the release is decided may be low. In other words, the communication resources in the idle state may be released semi-statically. For example, the frequency at which the release of communication resources of subframe units is decided is several periods of 10 ms. In this case, communication resources of subframe units released in a radio frame of 10 ms are used by the secondary system during several periods of 10 ms.

The present disclosure is focused on the release of communication resources of small units such as resource blocks. The secondary use of communication resources of small units such as resource blocks makes it possible to use all communication resources in the idle state, but dynamic control is necessary.

(Resource Blocks in LTE)

As described above, the present disclosure focuses on the release of communication resources of small units such as resource blocks, and thus resource blocks will be described in further detail. This point will be specifically described below with reference to FIG. 1.

FIG. 1 is an explanatory diagram for describing a format of a downlink resource block in LTE. Referring to FIG. 1, two resource blocks in a subframe are illustrated. As described above, each subframe is a communication resource of 12 sub carriers×7 OFDM symbols (1 slot). As described above, two resource blocks per subframe are present in a bandwidth of 12 sub carriers in a time (t) direction. Further, several resource blocks corresponding to a bandwidth of a frequency band being used are present in a frequency (f) direction. For example, in the frequency direction, there are a maximum of 110 resource blocks for each component carrier having a bandwidth of a maximum of 20 MHz. In communication resources of the LTE radio communication system, communication resources extending in the frequency direction and the time direction are divided into a number of resource blocks in the frequency direction and the time direction as described above. Further, communication resources are allocated to UEs in units of resource blocks. In other words, the UE can communication resources of resource block units.

Information indicating a resource block and a UE using a resource block, that is, scheduling information, is transmitted through a downlink control channel. More specifically, the scheduling information is transmitted through a PDCCH serving as a region of 3 OFDM symbols at the head of each subframe. The scheduling information includes a downlink assignment serving as downlink scheduling information and an uplink grant serving as uplink scheduling information. The downlink assignment designates a downlink resource block in a subframe, and the uplink grant designates an uplink resource block in a subframe after 4 or more subframes.

Further, most regions of 4th and subsequent OFDM symbols of each subframe serve as a physical downlink shared channel (PDSCH). Control information is transmitted through the PDCCH, and user data and some control information are transmitted through the PDSCH.

<1.3. Primary System and Secondary System>

(Overview)

Next, a common primary system and a common secondary system will be described. The primary system is a system having a priority for use of communication resources. Meanwhile, the secondary system is a system using communication resources in the idle state under conditions of having no influence on the primary system when there are communication resources in the idle state among communication resources of the primary system. Thus, the primary system has priority over the secondary system. The primary system and the secondary system may use different radio access techniques.

(Example of Primary System and Secondary System)

For example, the primary system is an LTE radio communication system. Meanwhile, for example, the secondary system is a wireless LAN communication system. As another example, the secondary system may be a radio communication system including UEs of LTE operating in a P2P mode. Further, as another example, the secondary system may be a radio communication system including an independent eNodeB (for example, a home eNodeB or a Pico eNodeB) and a UE communicating with the eNodeB.

(Relation Between Primary System and Secondary System in LTE)

As described above, the primary system is high in priority, and the secondary system is low in priority. In this case, it is difficult to imagine the secondary system transmitting a certain signal to the primary system. In other words, it is difficult to imagine the secondary system transmitting an inquiry to the primary system about the communication resources in the idle state. This is because such an inquiry may increase a load of the primary system. Generally, the secondary system does not perform transmission and reception of signals with the primary system, but independently determines communication resources of the primary system in the idle state and uses the determined communication resources without influencing the primary system. Here, when the secondary system has influence on the primary system, for example, it means that a signal transmitted by the secondary system using the communication resources serves as an interference source to the primary system and thus the throughput of the primary system is lowered.

Further, when the primary system is an LTE radio communication system, since the radio communication system is a system of a cellular scheme, a certain cell in the primary system neighbors another cell in the primary system. In this case, when there are communication resources in the idle state in a certain cell, and the secondary system uses the communication resources, it is desirable to consider that a transmission signal of the secondary system may serve as an interference source to a neighboring cell.

As described above, generally, transmission and reception of signals are not performed between the primary system and the secondary system according to the related art. For this reason, the secondary system measures radio waves of the primary system during a sufficiently long period of time, and then determines whether or not communication resources are being used in the primary system (that is, whether or not there are communication resources in the idle state). Then, when it is determined that there are communication resources in the idle state, the secondary system uses the communication resources considered to be in the idle state.

However, the technique of determining the communication resources in the idle state through the measuring of the secondary system carries a risk because communication of the primary system may start directly after the determining. Further, since it takes a long time to measure, it is difficult to secondarily use communication resources in the idle state that become available in a period shorter than a period of time necessary for the measuring.

Thus, when the LTE radio communication system is the primary system and the communication resources of the primary system are secondarily used, it is desirable that the secondary system notify the secondary system of the communication resources in the idle state. As the notifying technique, a technique of notifying the secondary system of the communication resources in the idle state using an LTE radio access of the primary system is considered. This is because a technique in which an eNodeB of the primary system gives a notification to the secondary system via a core network (and the Internet) is considered to take a long time and be unable to efficiently release the communication resources in the idle state.

<1.4. Technical Problems>

Technical problems when the frequency secondary use for effectively using the frequency resources in the temporally or spatially idle state described above is implemented will be described. Here, communication resources of small units such as resource blocks are assumed to be released. The description will proceed with an example in which the above-described frequency secondary use is implemented on, for example, an LTE or LTE-A platform.

First, as a premise, in the LTE radio communication system, scheduling information is transmitted through the PDCCH in each subframe as described above. For this reason, the UE of the primary system can check downlink resource blocks in a subframe allocated to its own device from the scheduling information transmitted through the PDCCH in the subframe. Further, the UE of the primary system can check uplink resource blocks in a subframe after 4 or more subframes which is allocated to its own device from the scheduling information transmitted through the PDCCH in the subframe. A general technique of transmitting the scheduling information through the PDCCH will be specifically described with reference to FIG. 2.

Figure 2:
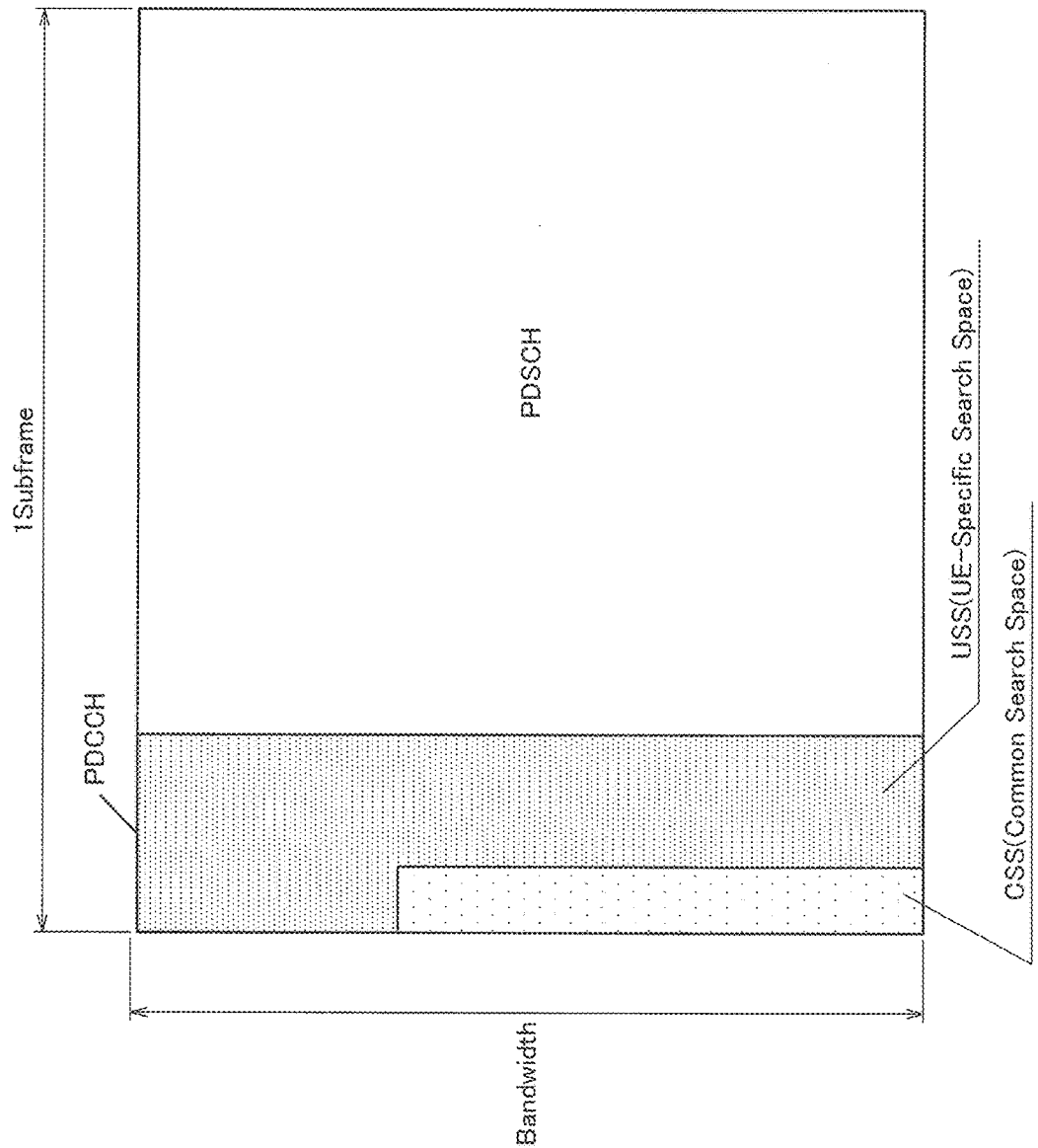
FIG. 2 is an explanatory diagram for describing an example of a general technique of transmitting scheduling information through PDCCH.

FIG. 2 is an explanatory diagram for describing a general technique of transmitting the scheduling information through the PDCCH. Referring to FIG. 2, a PDCCH and a PDSCH in a subframe are illustrated. As described above, the scheduling information is transmitted through the PDCCH, but in order to reduce a load of blind coding of a UE, a search space is specified for the PDCCH. More specifically, the PDCCH includes two types of spaces, that is, a common search space (CSS) and a UE-specific common search space (USS). In the PDCCH, first, a CSS is present, and thereafter a plurality of USSs follow. The CSS is a search space that is decoded in common by all UEs, and each of a plurality of USSs is a search space that is decoded by only some UEs serving as a target of individual USSs. Each UE performs blind coding on the CSS, and then performs blind coding on the USS corresponding to its own device.

As described above, in the LTE radio communication system, the scheduling information is transmitted. For this reason, when the primary system is the LTE radio communication system, the secondary system can check whether or not there is a downlink resource block in the idle state in the subframe based on the scheduling information transmitted through the PDCCH in the subframe. Further, the secondary system can check whether or not there is an uplink resource block in the idle state in a subframe after 4 or more subframes based on the scheduling information.

However, when the secondary system checks whether or not there is a resource block in the idle state, a large load typically occurs in the communication device of the secondary system. Specifically, the secondary system performs blind decoding on all CCEs of the PDCCH in order to check whether or not there is a resource block in the idle state. In other words, the secondary system performs blind coding on all CCEs including a CCE of a CSS and CCEs of a plurality of USSs. Thus, a large load occurs in the communication device of the secondary system.

Further, the secondary system may not check whether or not there is a resource block in the idle state unless information of the PDCCH is checked to the end. Thus, it may be difficult to secure a time necessary to secondarily use communication resources, particularly for the downlink.

Further, the checking of the resource block in the idle state causes a large problem. Since the CCEs of the USS of the PDCCH are scrambled while being masked by IDs of some UEs serving as a target of the USS, each UE performs demasking, descrambling, and decoding using an ID of its own device. Then, when it is determined that there is no error through a cyclic redundancy check (CRC), the UE can acquire the scheduling information and perform the checking. However, in order to check the resource block in the idle state, the secondary system performs demasking, descrambling, and decoding using all IDs for all CCEs. For this reason, when the secondary system checks the resource block in the idle state, a large load occurs in the communication device of the secondary system.

In this regard, in an embodiment of the present disclosure, it is possible to reduce a load occurring when the secondary system checks the communication resources of the primary system in the idle state. Next, specific content of <<2. Schematic configurations of primary system and secondary system>>, <<3. Configurations of respective devices>>, <<4. Processing flow>>, and <<5. Modified example>> will be described.

<<2. Schematic Configurations of Primary System and Secondary System>>

Figure 3:
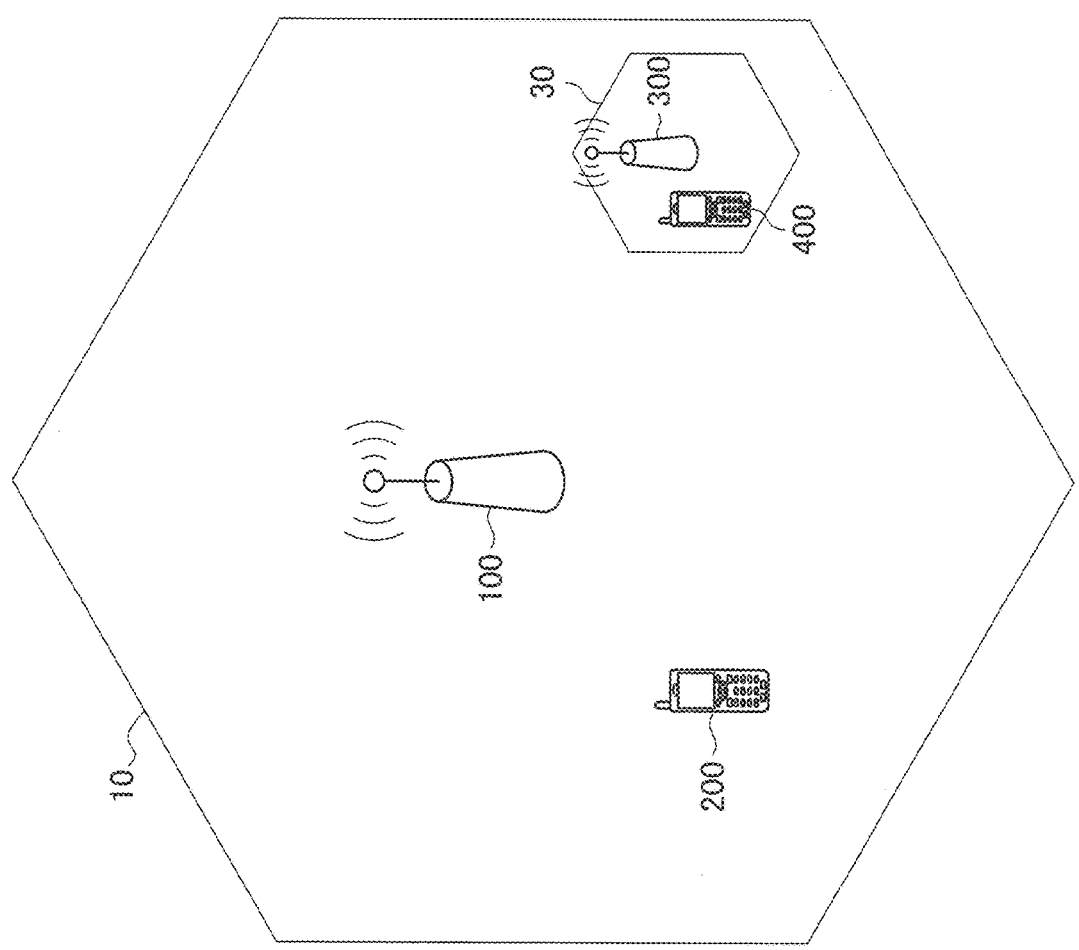
FIG. 3 is an explanatory diagram illustrating exemplary schematic configurations of a primary system and a secondary system according to an embodiment of the present disclosure.

First, schematic configurations of a primary system and a secondary system according to an embodiment of the present disclosure will be described with reference to FIG. 3. FIG. 3 is an explanatory diagram illustrating exemplary schematic configurations of a primary system and a secondary system according to an embodiment of the present disclosure. Referring to FIG. 3, a primary system including an eNodeB 100 and a UE 200 and a secondary system including a home eNodeB 300 and a UE 400 are illustrated. As described above, the primary system and the secondary system are LTE or LTE-A radio communication systems, for example.

(Primary System)

For example, the primary system includes the eNodeB 100 and the UE 200 as described above. The eNodeB 100 performs radio communication with the UE 200 using a frequency band of the primary system in a cell 10 of the primary system. For example, the frequency band is a component carrier (CC). The CC has a bandwidth of a maximum of 20 MHz.

The eNodeB 100 performs radio communication with the UE 200 in units of time in radio communication. A unit of time in radio communication is a radio frame of 10 ms. Further, since a radio frame includes 10 subframes, a unit of time in radio communication is also referred to as a subframe of 1 ms.

The eNodeB 100 performs uplink and downlink scheduling in units of resource blocks. In other words, the eNodeB 100 allocates uplink communication resources and downlink communication resources in units of resource blocks to the UE 200. A CC includes a maximum of 110 resource blocks in the frequency direction, and a subframe includes 2 resource blocks in the time direction. In other words, a CC includes a maximum of 220 resource blocks for each subframe. The eNodeB 100 transmits the scheduling information through the PDCCH.

(Secondary System)

For example, the secondary system includes the home eNodeB 300 and the UE 400 as described above. The secondary system secondarily uses the frequency band of the primary system. In other words, the home eNodeB 300 performs communication with the UE 400 using communication resources in the idle state which are not used in the primary system. Particularly, in an embodiment of the present disclosure, communication resources of small units such as resource blocks in the idle state are used by the secondary system. In other words, the home eNodeB 300 performs communication with the UE 400 using resource blocks that are not used by the primary system.

<<3. Configurations of Respective Devices>>

Next, exemplary configurations of an eNodeB of the primary system and a home eNodeB of the secondary system will be described with reference to FIGS. 4 to 9.

<3.1. Configuration of eNodeB>

Figure 4:
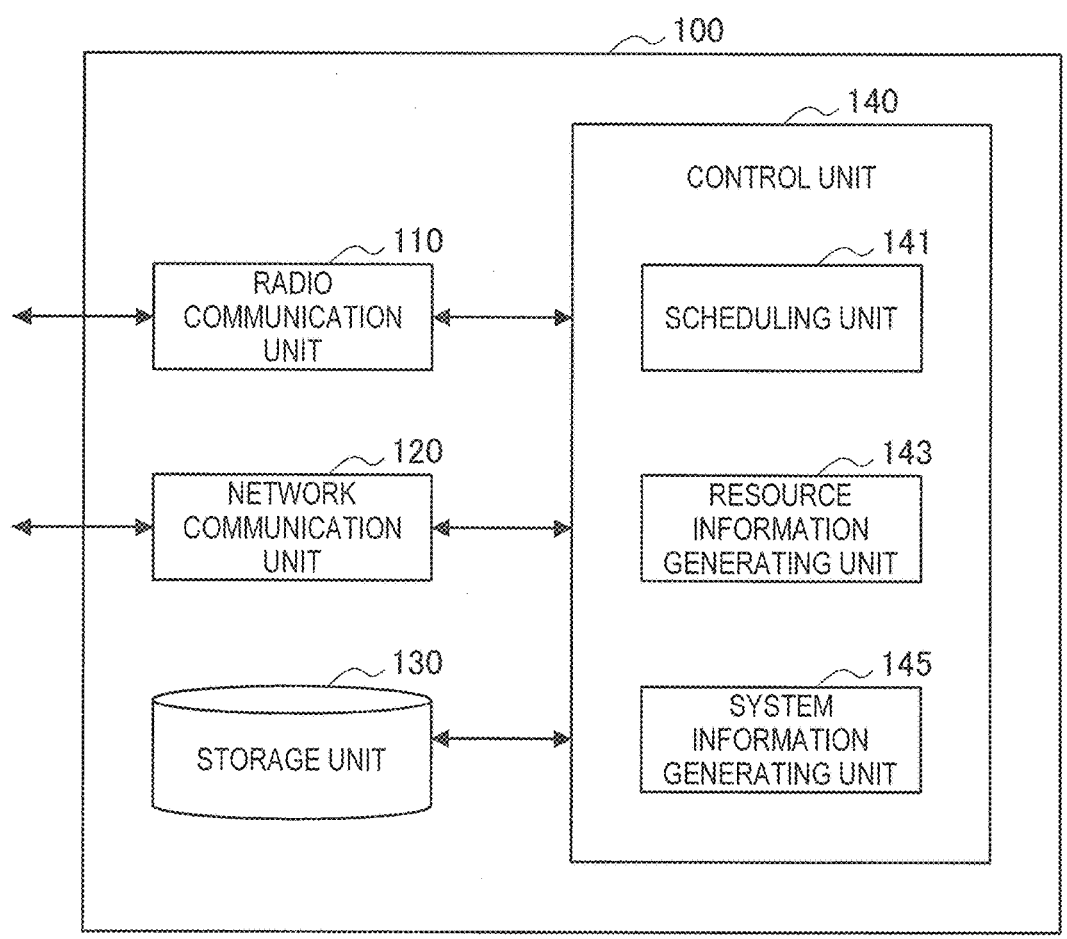
FIG. 4 is a block diagram illustrating an exemplary configuration of an eNodeB of a primary system according to the present embodiment.

First, an exemplary configuration of the eNodeB 100 of the primary system according to the present embodiment will be described with reference to FIGS. 4 to 8. FIG. 4 is a block diagram illustrating an exemplary configuration of the eNodeB 100 of the primary system according to the present embodiment. Referring to FIG. 4, the eNodeB 100 includes a radio communication unit 110, a network communication unit 120, a storage unit 130, and a control unit 140.

(Radio Communication Unit 110)

The radio communication unit 110 performs radio communication with a plurality of UEs 200 of the primary system using communication resources of the primary system. For example, the communication resources are the resource blocks. The primary system has one or more frequency bands (for example, 1 or more component carriers). The frequency band is divided in units of 12 sub carriers, and communication resources corresponding to 1 slot (0.5 subframes) of the 12 sub carriers are used as the resource block.

The radio communication unit 110 transmits resource information generated by the control unit 140 (a resource information generating unit 143) through a downlink control channel including a common space that is decoded in common by the plurality of UEs and a plurality of individual spaces that are decoded by only some of the plurality of terminal apparatuses. The resource information is information for notifying the secondary system secondarily using communication resources of the primary system of available communication resources.

More specifically, for example, the radio communication unit 110 transmits the resource information through the PDCCH including the common search space (CSS) and a plurality of UE-specific common search spaces (USSs). The resource information is information for notifying the secondary system of a resource block in the idle state. The number of resource blocks in the idle state notified of through the resource information is not limited to one and may be 2 or more. Further, the resource block in the idle state notified of through the resource information may be either or both of the downlink resource block and the uplink resource block.

Further, for example, the resource information includes position information indicating a position of a resource block in the idle state in a subframe in the time direction and a position of a resource block in the idle state in a subframe in the frequency direction. For example, the position in the time direction is a slot (a first slot or a second slot) in which there is a resource block. Further, the position in the frequency direction is a frequency of the resource block in the idle state. Further, when a plurality of resource blocks in the idle state are consecutive in the frequency direction, the resource information may indicate the entire bandwidth of the plurality of resource blocks in the idle state instead of the position in the frequency direction.

As described above, when the information of the resource block in the idle state is transmitted, the communication device of the secondary system can check the resource block in the idle state based on the information. Thus, the communication device of the secondary system need not check all the scheduling information of the PDCCH. As a result, the load of the communication device of the secondary system is reduced.

Further, for example, the downlink control channel includes the common space, the plurality of individual spaces, and a secondary system space the having the same format as the individual space. The radio communication unit 110 transmits the resource information using the secondary system space.

More specifically, the PDCCH includes a CSS, a plurality of USSs, and a secondary spectrum use search space (SSUSS) having the same format as the USS. The radio communication unit 110 transmits the resource information using the SSUSS. This point will be specifically described below with reference to FIG. 5.

Figure 5:
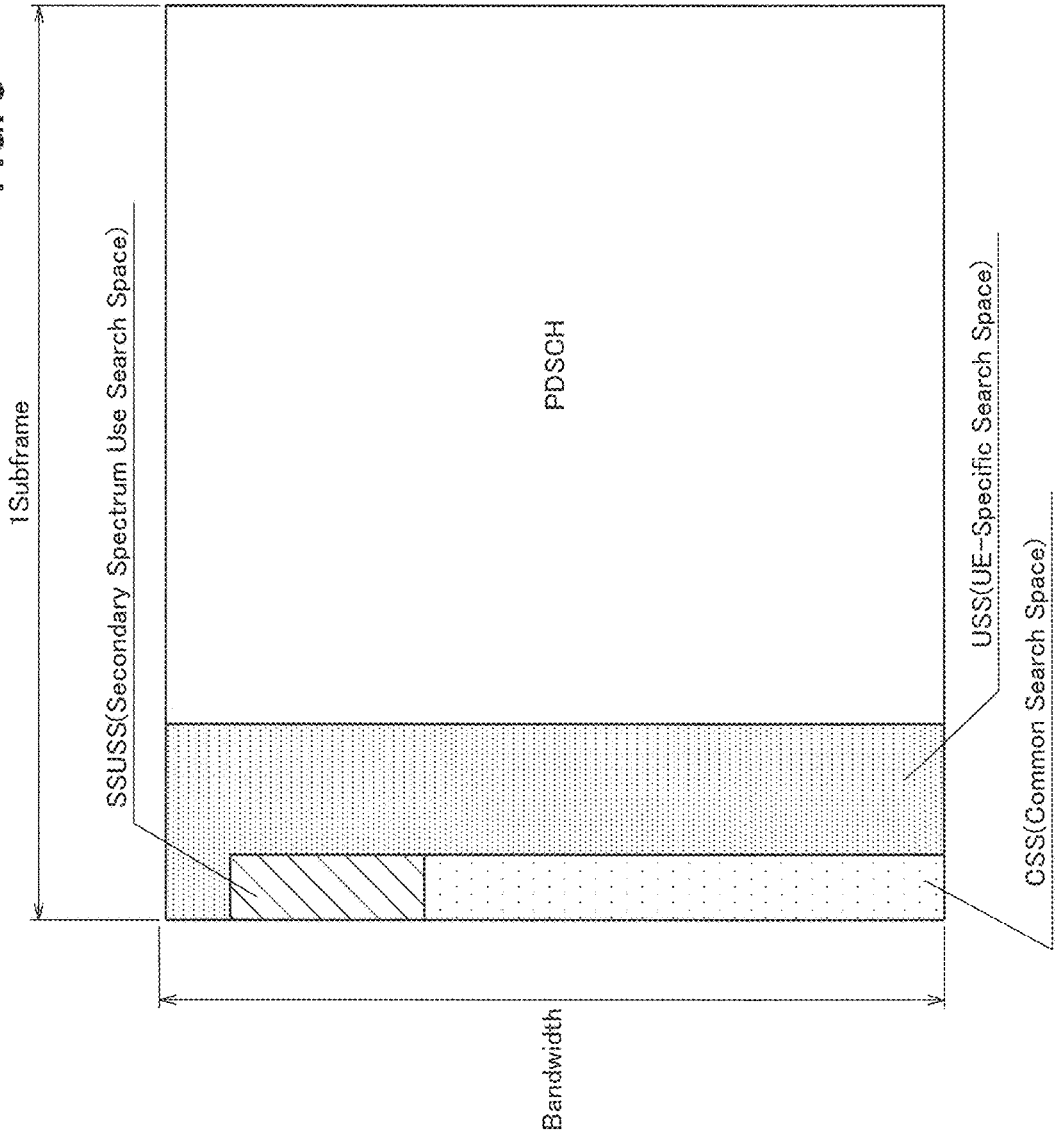
FIG. 5 is an explanatory diagram for describing an exemplary technique of transmitting resource information through a PDCCH.

FIG. 5 is an explanatory diagram for describing an exemplary technique of transmitting the resource information through the PDCCH. Referring to FIG. 5, a PDCCH and a PDSCH in a subframe are illustrated. The PDCCH includes a CSS, a plurality of USSs, and an SSUSS. Since the SSUSS has the same format as the USS, for example, the CCEs of the SSUSS are scrambled while being masked by a certain ID. Thus, the certain ID is shared by the communication devices of the secondary system. The communication device (for example, the home eNodeB 300) of the secondary system can acquire the resource information by performing demasking, descrambling, and decoding using the certain ID. Further, when there are a plurality of secondary systems, a different ID may be used according to a secondary system. Meanwhile, in the primary system, the UE 200 of the primary system does not decode the SSUSS since the SSUSS has the same format as the USS rather than the CSS.

As described above, using the SSUSS, the communication device of the secondary system need not perform processing using various IDs, and processing of the UE 200 of the primary system is not increased. In other words, the load of the communication device of the secondary system can be reduced without increasing the load of the UE of the primary system.

Further, since the SSUSS has the same format as the format of the USS rather than the format of the CSS, the CSS is similar to that of the existing system. For this reason, when the CSS is arranged in the PDCCH similarly to the existing system, the UE of the primary system decodes the CSS similarly to the existing system. Furthermore, the SSUSS is viewed to be similar to the USS by the UE of the primary system. The SSUSS is not decoded by any UE of the primary system. Thus, regardless of the presence or absence of the SSUSS, the UE of the primary system decodes the USS corresponding to its own device in addition to the CSS, similarly to the existing system. As described above, the presence of the SSUSS does not have influence on an operation of the UE of the primary system. Thus, backward compatibility with the existing system can be secured.

Further, for example, the secondary system space is positioned ahead of all or some of the plurality of individual spaces in the time direction in the downlink control channel.

More specifically, the SSUSS is positioned ahead of all or some of a plurality of USSs in the time direction in the PDCCH. In other words, the radio communication unit 110 transmits a signal of the SSUSS in the PDCCH before all or some of a plurality of USSs. Referring back to FIG. 5, the SSUSS is positioned between the CSS and a plurality of USSs in the processing process. For example, the USS is transmitted through a first OFDM symbol of a subframe, and each of a plurality of USSs is transmitted through any one of first to third OFDM symbols.

As the SSUSS is positioned forward in the time direction as described above, the SSUSS can be decoded early, and thus a preparation time necessary for the secondary system to use the resource block can be further increased.

Further, for example, the radio communication unit 110 transmits the system information of the frequency band of the primary system. The system information is generated by a system information generating unit 145 which will be described later.

(Network Communication Unit 120)

The network communication unit 120 communicates with other communication nodes. For example, the network communication unit 120 communicates with the home eNodeB 300 of the secondary system directly or a certain communication node.

(Storage Unit 130)

The storage unit 130 stores a program and data that are necessary for an operation of the eNodeB 100. For example, the storage unit 130 includes a storage medium such as a hard disk or a semiconductor memory.

(Control Unit 140)

The control unit 140 provides various kinds of functions of the eNodeB 100. For example, the control unit 140 corresponds to a processor such as a CPU or a DSP, and executes a program stored in the storage unit 130 or any other storage medium to provide various kinds of functions. The control unit 140 includes a scheduling unit 141, the resource information generating unit 143, and the system information generating unit 145.

(Scheduling Unit 141)

The scheduling unit 141 performs uplink and downlink scheduling. For example, the scheduling unit 141 performs the scheduling in units of resource blocks. In other words, the eNodeB 100 allocates uplink communication resources and downlink communication resources in units of resource blocks to the UE 200.

(Resource Information Generating Unit 143)

The resource information generating unit 143 generates resource information for notifying the secondary system secondarily using the communication resources of the primary system of available communication resources.

More specifically, the resource information generating unit 143 specifies a resource block in the idle state, for example, based on the downlink and uplink scheduling result performed by the scheduling unit 141. Then, the resource information generating unit generates the resource information for notifying of the specified resource block.

As the resource information is generated, it is possible to notify the secondary system of the communication resources in the idle state.

Further, for example, the resource information includes identification information uniquely identifying the available communication resources among a plurality of devices. This point will be concretely described below with reference to FIGS. 6 and 7.

Figure 6:
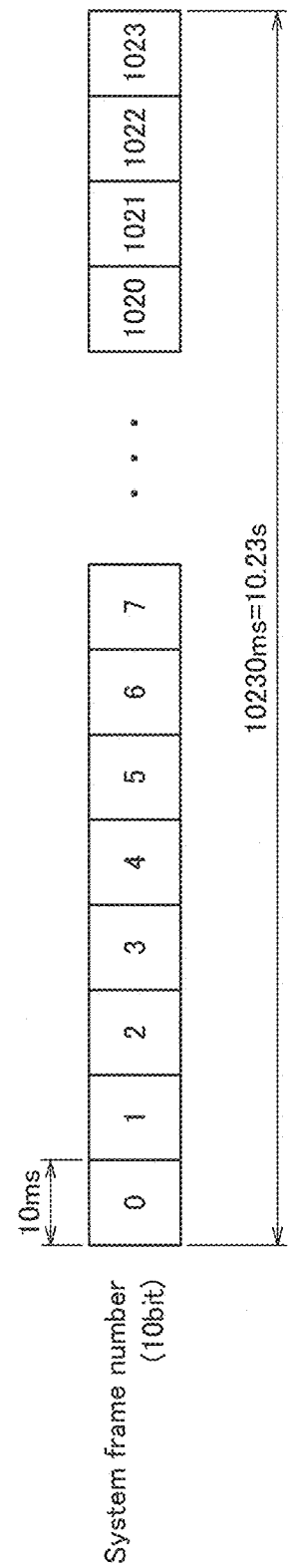
FIG. 6 is an explanatory diagram for describing exemplary information uniquely identifying a radio frame including a resource block in an idle state among a plurality of devices.

FIG. 6 is an explanatory diagram for describing exemplary information uniquely identifying a radio frame including a resource block in the idle state among a plurality of devices. Referring to FIG. 6, 1024 radio frames (which are also referred to as "system frames") and system frame numbers (SFNs) identifying the respective radio frames are illustrated. As described above, in LTE, it is possible to uniquely identify each of 1024 radio frames (radio frames within a duration of 10.23 seconds) among a plurality of devices using the SFN added to the radio frame.

Figure 7:
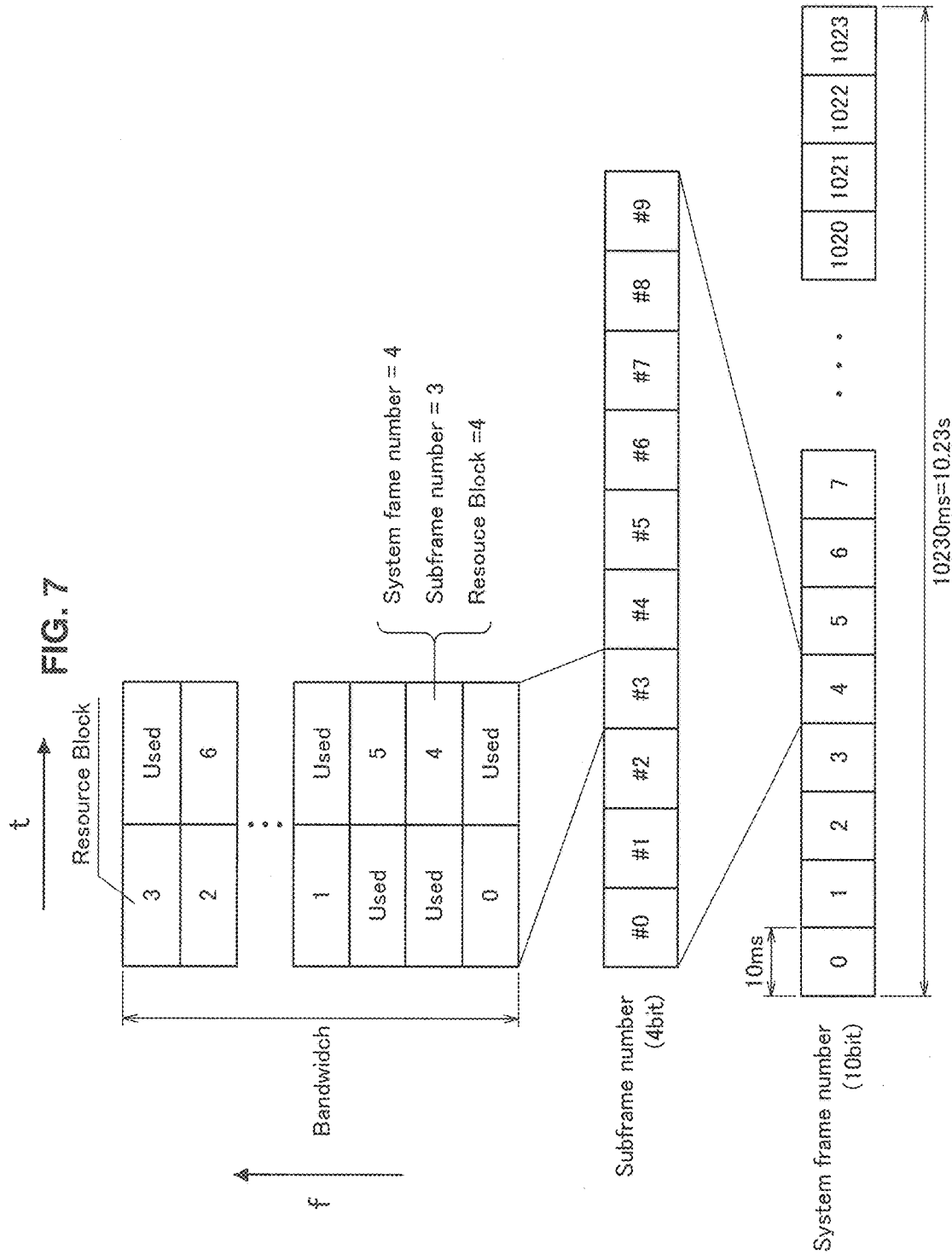
FIG. 7 is an explanatory diagram for describing exemplary information uniquely identifying a resource block in an idle state among a plurality of devices.

FIG. 7 is an explanatory diagram for describing exemplary information uniquely identifying a resource block in the idle state among a plurality of devices. Referring to FIG. 7, 10 subframes included in a radio frame having an SFN of 4 are illustrated. The subframes included in the radio frame are uniquely identified by subframe numbers #0 to #9. Further, resource blocks included in the subframe of the subframe #3 are illustrated. Generally, in LTE, identification information uniquely identifying the resource blocks in the subframe is not specified. Thus, for example, the resource information generating unit 143 allocates serial numbers to the resource blocks in the idle state in the subframe as the identification information. For example, as illustrated in FIG. 7, the resource information generating unit 143 first allocates the serial number to the resource block in the idle state in the first slot in ascending order of frequency, and then allocates the serial number to the resource block in the idle state in the second slot in ascending order of frequency.

As described above, a radio frame, a subframe, and a resource block can be uniquely identified among a plurality of devices. For example, identification information of a resource block is indicated by (an SFN, a subframe number, and a serial number of the resource block in the idle state). For example, identification information of a resource block that is second lowest in frequency in the second slot in the subframe #3 in the radio frame having the SFN 4 is indicated by (4,3,4).

Based on the identification information, it is possible to uniquely identify the resource block that is in the idle state during a maximum of about 10 seconds among a plurality of devices. Thus, for example, when a plurality of communication devices of the secondary system use the resource blocks in the idle state, the plurality of communication devices can identify the resource block in the idle state using the same identification information. Thus, the plurality of communication devices can adjust which communication device uses which resource block. Thus, as the plurality of communication devices use the resource blocks in the idle state at the same time, the occurrence of a collision can be prevented.

Further, since the adjustment can be performed between the secondary systems based on the identification information, the load of the primary system is not increased. More specifically, for example, when the eNodeB 100 of the primary system detects IDs of a plurality of communication devices of the secondary system and allocates the resource blocks in the idle state to the plurality of communication devices, the load of the eNodeB 100 of the primary system may be increased However, when the adjustment is performed between the secondary systems based on the identification information regardless of the primary system, the load of the primary system is not increased.

The plurality of communication devices of the secondary system may be communication devices of different secondary systems or may be communication devices of the same secondary system.

An algorithm for the adjustment performed among a plurality of communication devices may be freely designated according to the secondary system. For example, when there are 10 communication devices in the secondary system, the resource blocks in the idle state may be equally distributed to the 10 communication devices.

Further, for example, the resource information includes information for notifying the secondary system of available uplink communication resources of the primary system.

More specifically, the resource information includes information for notifying the secondary system of the resource blocks in the idle state among the uplink resource blocks of the primary system. In other words, the SSUSS is used to notify of the uplink resource block in the idle state of the primary system.

As described above, as the notification of the uplink resource block in the idle state is given, the load of the communication device of the secondary system that desires to check the resource block in the idle state can be reduced. This point will be specifically described below with reference to FIG. 8.

Figure 8:
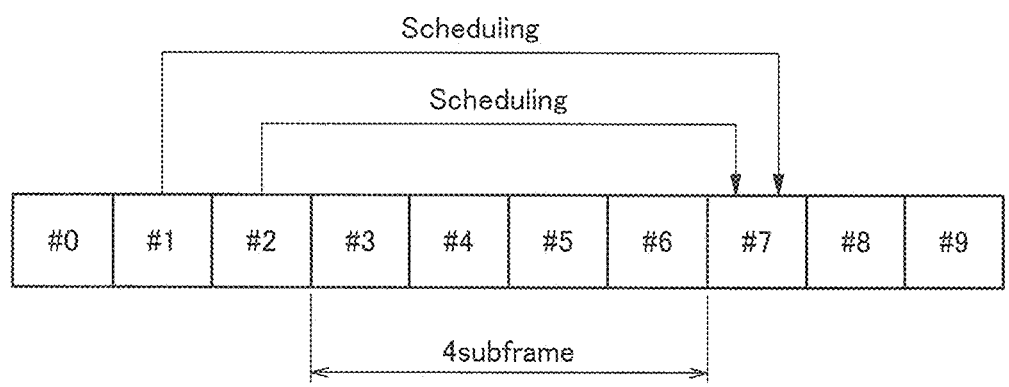
FIG. 8 is an explanatory diagram for describing an example of transmitting uplink scheduling information through a PDCCH.

FIG. 8 is an explanatory diagram for describing an example of transmitting the uplink scheduling information through the PDCCH. Referring to FIG. 8, 10 subframes included in a radio frame are illustrated. The uplink scheduling information as well as the downlink scheduling information is transmitted through the PDCCH of each subframe. The downlink scheduling information designates a resource block in the idle state in a subframe in which the scheduling information is transmitted. Meanwhile, as illustrated in FIG. 8, the uplink scheduling information designates a resource block in a subframe after 4 or more subframes from a subframe in which the scheduling information is transmitted. Thus, in order to check the uplink resource block in the idle state from the uplink scheduling information, the communication device of the secondary system has to perform blind coding on all CCEs of a previous subframe and hold obtained information. Thus, when the uplink resource block in the idle state is checked from the scheduling information, the load of the secondary system is larger than when the downlink resource block in the idle state is checked from the scheduling information. Thus, the resource information generating unit 143 generates the resource information including the information for notifying the secondary system of the uplink resource block of the primary system in the idle state. Thus, it is possible to particularly to reduce the load of the communication device of the secondary system that desires to check the resource block in the idle state.

Further, for example, the uplink resource block in the idle state notified through the resource information is a resource block in a subframe directly after a subframe in which the resource information is transmitted.

(System Information Generating Unit 145)

The system information generating unit 145 generates the system information of the frequency band of the primary system.

<3.2. Configuration of Home eNodeB>

Figure 9:
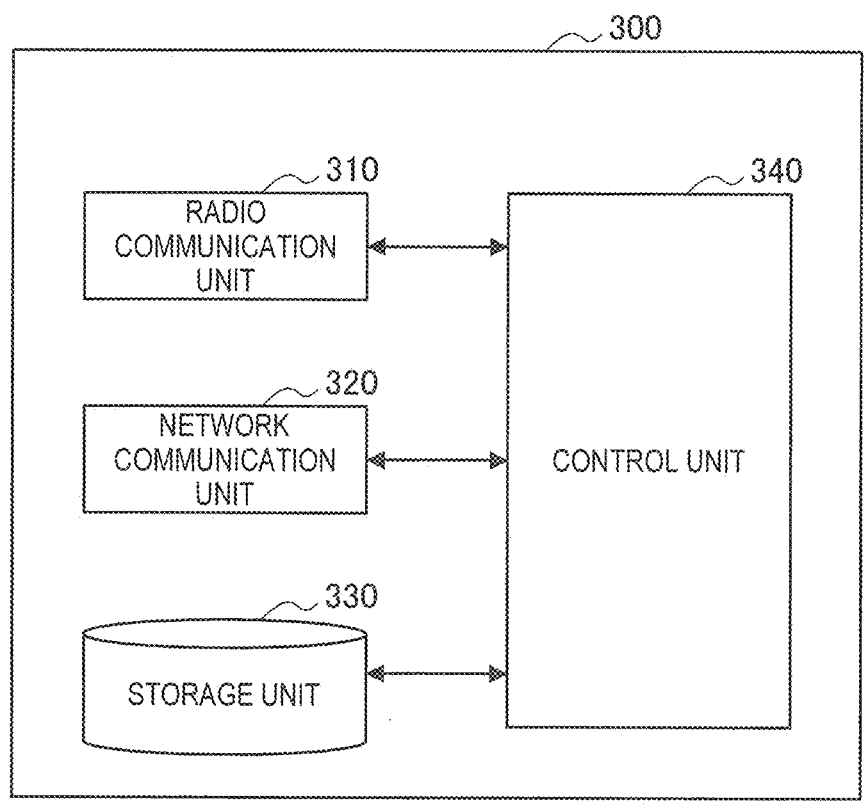
FIG. 9 is a block diagram illustrating an exemplary configuration of an eNodeB of a secondary system according to the present embodiment.

Next, an exemplary configuration of the home eNodeB 300 of the secondary system according to the present embodiment will be described with reference to FIG. 9. FIG. 9 is a block diagram illustrating an exemplary configuration of the eNodeB 300 of the secondary system according to the present embodiment. Referring to FIG. 9, the home eNodeB 300 includes a radio communication unit 310, a network communication unit 320, a storage unit 330, and a control unit 340.

(Radio Communication Unit 310)

The radio communication unit 310 receives the resource information through the downlink control channel including the common space and the plurality of individual spaces. The received resource information is acquired by decoding the downlink control channel.

More specifically, the radio communication unit 310 receives the resource information through the PDCCH including the CSS and the plurality of USSs. For example, the radio communication unit 310 receives the resource information through the SSUSS of the PDCCH. Further, the resource information is acquired by decoding the SSUSS of the PDCCH.

As the resource information is received and acquired, the secondary system can check the communication resources of the primary system in the idle state without a large load.

The radio communication unit 310 performs radio communication with the UE 400 of the secondary system using available communication resources among communication resources of the primary system according to control by the control unit 340.

The radio communication unit 310 receives the system information of the frequency band of the primary system.

(Network Communication Unit 320)

The network communication unit 320 performs communication with other communication nodes. For example, the network communication unit 320 performs communication with the eNodeB 100 of the primary system directly or via a certain communication node.

(Storage Unit 330)

The storage unit 330 stores a program and data that are necessary for an operation of the home eNodeB 300. For example, the storage unit 330 includes a storage medium such as a hard disk or a semiconductor memory.

(Control Unit 340)

The control unit 340 provides various kinds of functions of the home eNodeB 300. For example, the control unit 340 corresponds to a processor such as a CPU or a DSP, and executes a program stored in the storage unit 330 or any other storage medium to provide various kinds of functions.

The control unit 340 acquires the resource information. The control unit 340 causes the radio communication unit 310 to perform radio communication using the available communication resources based on the resource information.

More specifically, the control unit 340 causes the radio communication unit 310 to perform radio communication using the resource blocks in the idle state based on the resource information.

Further, when there are a plurality of secondary systems secondarily using the communication resources of the primary system in the idle state, the control unit 340 performs an adjustment to the use of the communication resources in the idle state with the communication devices of the other secondary systems, for example, through the network communication unit 320.

The control unit 340 acquires the system information.

<<4. Processing Flow>>

Figure 10:
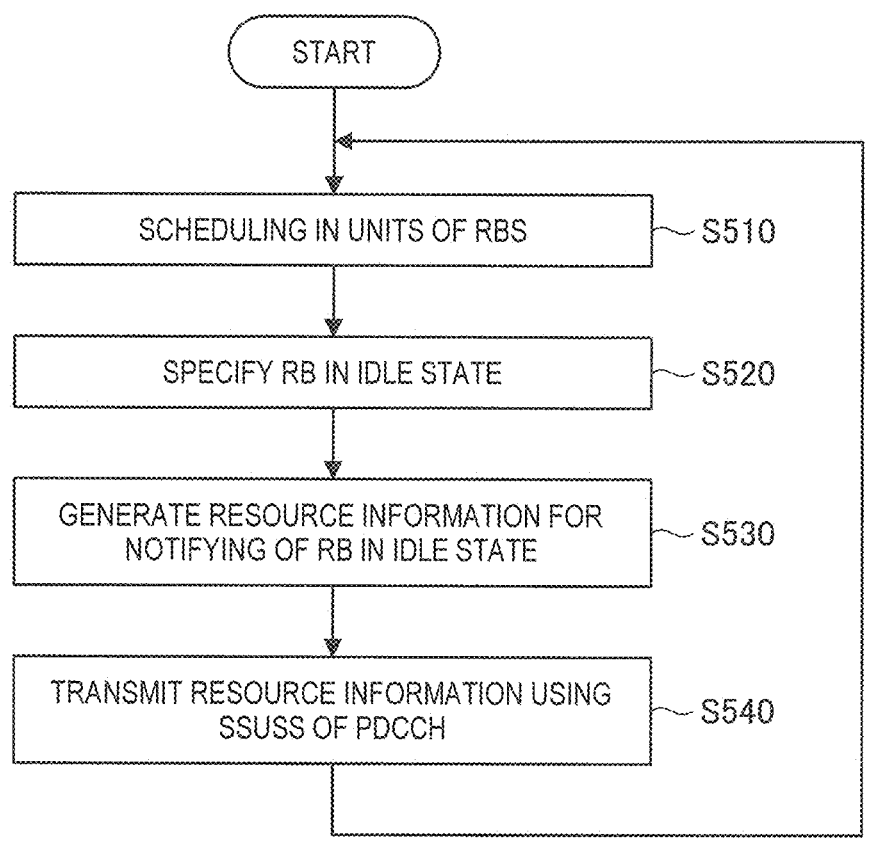
FIG. 10 is a flowchart illustrating an exemplary schematic flow of a communication control process of an eNodeB side of a primary system according to the present embodiment.
Figure 11:
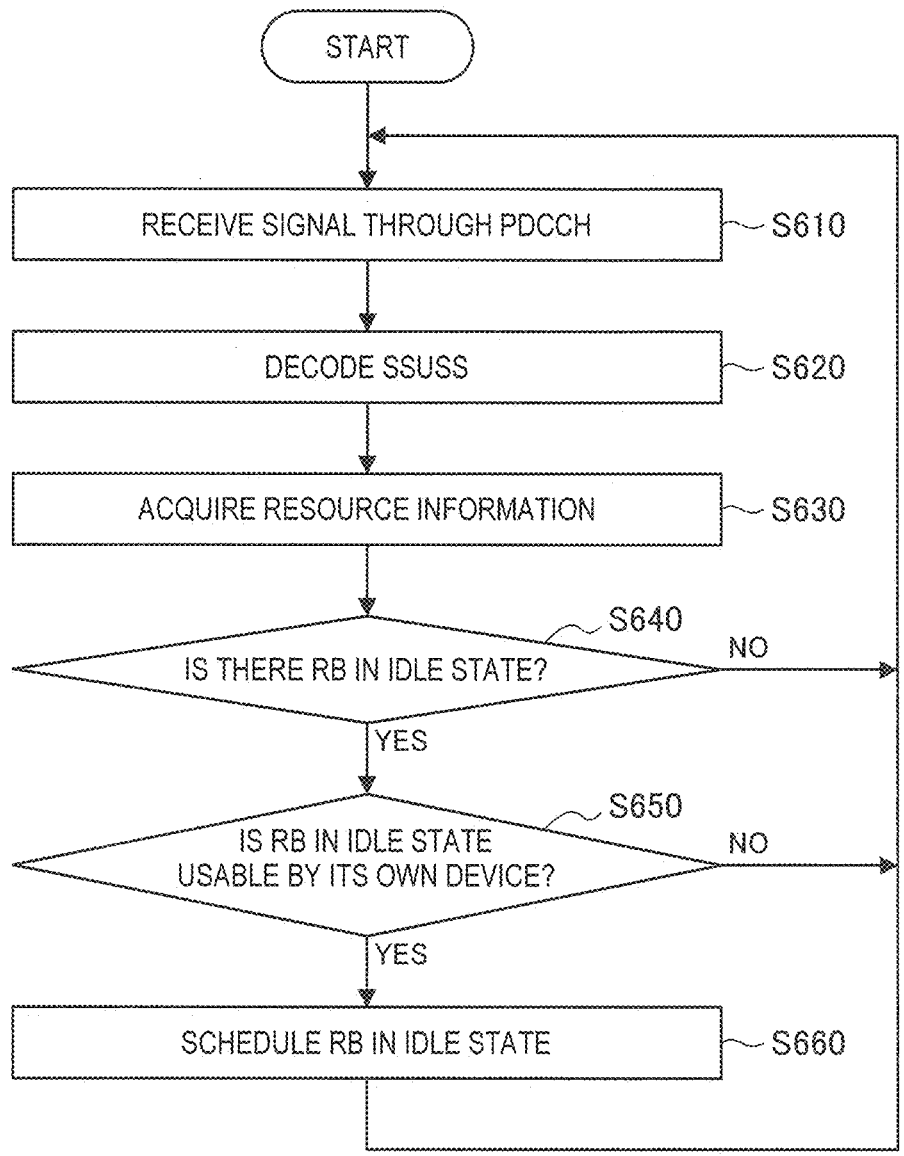
FIG. 11 is a flowchart illustrating an exemplary schematic flow of a communication control process of a home eNodeB side of a secondary system according to the present embodiment.

Next, an exemplary communication control process according to the present embodiment will be described with reference to FIGS. 10 and 11.

(Processing of eNodeB 100 of Primary System)

First, an exemplary communication control process of the eNodeB 100 side of the primary system according to the present embodiment will be described with reference to FIG. 10. FIG. 10 is a flowchart illustrating an exemplary schematic flow of a communication control process of the eNodeB 100 side of the primary system according to the present embodiment.

First, in step S510, the scheduling unit 141 performs the downlink and uplink scheduling in units of resource blocks.

In step S520, the resource information generating unit 143 specifies the resource block (RB) in the idle state based on the scheduling result.

In step S530, the resource information generating unit 143 generates the resource information for notification of the resource block in the idle state.

In step S540, the radio communication unit 110 transmits the resource information using the SSUSS of the PDCCH. Then, the process returns to step S510.

(Processing of Home eNodeB 300 of Secondary System)

Next, an exemplary communication control process of the home eNodeB 300 side of the secondary system according to the present embodiment will be described with reference to FIG. 11. FIG. 11 is a flowchart illustrating an exemplary schematic flow of a communication control process of the home eNodeB 300 side of the secondary system according to the present embodiment.

First, in step S610, the radio communication unit 310 receives a signal through the PDCCH. Then, in step S620, the radio communication unit 310 decodes the SSUSS. Then, in step S630, the control unit 340 acquires the resource information.

Then, in step S640, the control unit 340 determines whether or not there is a resource block in the idle state among the resource blocks of the primary system based on the resource information. When there is a resource block in the idle state, the process proceeds to step S650. Otherwise, the process returns to step S610.

In step S650, the control unit 340 determines whether or not the resource block in the idle state is usable by its own device. For example, the determining is performed based on a result of an adjustment with the communication devices of the other secondary systems. When the resource block is usable, the process proceeds to step S660. Otherwise, the process ends.

In step S660, the control unit 340 performs scheduling of the resource block in the idle state. As a result of scheduling, the communication device of the secondary system performs radio communication. Then, the process returns to step S610.

<<5. Modified Example>>

Next, a modified example of the first embodiment will be described. In the present modified example, the primary system generates likelihood information for notifying the secondary system of the likelihood of the presence of available communication resources, and transmits the system information including the likelihood information.

Thus, the communication device of the secondary system determines whether or not there are likely to be communication resources in the idle state based on the system information before decoding the PDCCH. Then, when there are likely to be communication resources in the idle state, the communication device decodes the PDCCH, and otherwise, the communication device does not decode the PDCCH. Thus, since the decoding of the PDCCH is minimized, the load of the communication device of the secondary system can be further reduced.

Further, when the secondary system desires to use the communication resources in the idle state for a plurality of frequency bands, the likelihood information is more effective. For example, one primary system is assumed to have a plurality of frequency bands (component carriers), or there are assumed to be a plurality of primary systems having different frequency bands for one secondary system. In this case, the communication device of the secondary system can check the likelihood information of each of a plurality of frequency bands and determine a frequency band in which decoding of the PDCCH is more effective. Thus, the load of the communication device of the secondary system can be remarkably reduced.

<5.1. Configuration of eNodeB>

Next, a configuration of an eNodeB 100 according to the modified example of the present embodiment will be described. Here, technical features to be added to the configuration of the eNodeB 100 of the present embodiment will be described.

(Resource Information Generating Unit 143)

The resource information generating unit 143 generates the likelihood information for notifying the secondary system of the likelihood of the presence of available communication resources.

More specifically, for example, the resource information generating unit 143 measures the likelihood that there will be communication resources in the idle state based on the utilization state of the communication resources of the primary system. Then, the resource information generating unit 143 generates the likelihood information for notifying of the likelihood based on the measurement result. For example, the likelihood information is generated for each frequency band (component carrier).

The likelihood information is arbitrary information that makes it possible to check for the presence of the communication resources in the idle state in advance. For example, the likelihood information may be an estimation value of the number of resource blocks in the idle state per subframe, a probability that a resource block in the idle state will be included in one subframe, binary information indicating whether or not there is likely to be a resource block in the idle state, or the like.

For example, the utilization state of the communication resources is an actual value or an estimation value of at least one of the number of UEs that are in a connection state with a frequency band, the sum of the number of UEs and the number of UEs that desire a connection with a frequency band, a utilization rate of communication resources in a frequency band, and a traffic volume in a frequency band, or a value derived from the actual value or the estimation value.

(System Information Generating Unit 145)

The system information generating unit 145 generates the system information including the likelihood information.

Further, for example, the system information includes the likelihood information and other likelihood information (hereinafter referred to as "other system likelihood information") for notifying the secondary system of the likelihood of the presence of available communication resources of other primary systems.

More specifically, for example, the system information generating unit 145 acquires the other system likelihood information for notifying the secondary system of the likelihood of the presence of the resource block of the other primary systems in the idle state through the network communication unit 120. Then, the system information generating unit 145 generates system information including the likelihood information and the other system likelihood information.

As described above, as the likelihood information of the other primary systems is also included in the system information, the hardware cost of the communication device of the secondary system can be reduced. More specifically, when the secondary system is configured to simultaneously receive signals from a plurality of eNodeBs through different frequency bands, the hardware cost increases. Thus, as the likelihood information of a plurality of primary systems is transmitted from one primary system, the secondary system simultaneously receives signals from a small number of eNodeBs through a small number of frequency bands. Thus, the hardware cost of the communication device of the secondary system can be reduced.

(Radio Communication Unit 110)

The radio communication unit 110 transmits the system information that serves as the system information of the frequency band of the primary system and includes the generated likelihood information. Further, for example, the radio communication unit 110 transmits the system information including the likelihood information and the other system likelihood information.

<5.2. Configuration of Home eNodeB>

Next, a configuration of a home eNodeB 300 according to the modified example of the present embodiment will be described. Here, technical features to be added to the configuration of the home eNodeB 300 of the present embodiment will be described.

(Radio Communication Unit 310)

The radio communication unit 310 receives the system information of the frequency band of the primary system. The system information includes the likelihood information. Further, for example, the system information further includes the other system likelihood information.

Further, as described above, the radio communication unit 310 receives the resource information through the downlink control channel including the common space and the plurality of individual spaces. The received resource information is acquired by the decoding of the downlink control channel, but in the modified example of the present embodiment, the decoding of the downlink control channel is performed only when the control unit 340 decides execution of the decoding.

(Control Unit 340)

The control unit 340 decides execution of the decoding of the downlink control channel based on the likelihood information included in the system information.

More specifically, the control unit 340 acquires the system information, and acquires the likelihood information included in the system information. Then, the control unit 340 determines whether or not the decoding is executed based on the acquired likelihood information. For example, a threshold value for the likelihood information is decided in advance, and it is determined whether or not the decoding is executed based on a comparison result between the likelihood information and the threshold value. When the decoding is determined to be executed, the control unit 340 decides execution of the decoding.

Further, when the primary system includes a plurality of frequency bands and there are a plurality of pieces of likelihood information, for example, the control unit 340 compares the likelihood information of the respective frequency bands, and selects a frequency band estimated to have more resource blocks in the idle state. Then, the control unit 340 decides execution of decoding of the selected frequency band.

As execution of the decoding is decided based on the likelihood information, the decoding of the PDCCH is minimized, and thus the load of the communication device (that is, home eNodeB) of the secondary system can be reduced.

Further, for example, the control unit 340 decides execution of the decoding of the downlink control channel based on the likelihood information included in the system information and the other system likelihood information.

More specifically, the control unit 340 acquires the system information, and acquires the likelihood information included in the system information and the other system likelihood information. Then, for example, the control unit 340 compares the acquired likelihood information with the other system likelihood information, and selects a frequency band (the primary system) estimated to have more resource blocks in the idle state. Then, the control unit 340 decides execution of decoding of the selected frequency band.

As execution of the decoding is decided based on the likelihood information of a plurality of primary systems, decoding to be executed is limited to decoding of a more effective frequency band, and thus the load of the communication device (that is, the home eNodeB 300) of the secondary system can be remarkably reduced.

Further, the control unit 340 may decide execution of the decoding of the downlink control channel based on the likelihood information included in the system information and the other system likelihood information and a measurement result of measuring reception power from the eNodeB of the primary system.

More specifically, the control unit 340 can specify the primary system having more resource blocks in the idle state based on the likelihood information and the other system likelihood information. Further, the control unit 340 can specify the primary system in which interference caused by the use of the resource blocks of the secondary system is small based on the measurement result of the reception power of the eNodeB of the primary system. For example, the control unit 340 can specify the primary system of the eNodeB that is high in reception power to be the primary system that is low in interference. This point will be described below in further detail.

Generally, when the reception power from the eNodeB is high, a distance between the eNodeB and the home eNodeB 300 is determined to be small. Further, as the distance decreases, the interference caused as the home eNodeB 300 uses the resource blocks of the primary system of the eNodeB decreases. This is because, as the distance decreases, a distance between a neighboring cell of the cell of the eNodeB and the home eNodeB 300 increases, and interference of the home eNodeB 300 to the neighboring cell decreases. Further, in the cell of the eNodeB, the resource block in the idle state is not used, but in the neighboring cell, the resource block in the idle state is likely to be used, and thus problematic interference is interference in the neighboring cell rather than interference in the eNodeB.

Thus, the control unit 340 selects a desired frequency band (the primary system) based on an evaluation criterion such as an amount of resource blocks in the idle state and an evaluation criterion such as suppression of interference. Then, the control unit 340 decides execution of the decoding of the selected frequency band.

As execution of the decoding is decided based on the measurement result of the reception power, it is possible to suppress interference between the primary system and the secondary system.

Further, when the primary system has a plurality of frequency bands (component carriers), the likelihood information for each of the plurality of frequency bands may be included in the system information of one of the plurality of frequency bands. Thus, the communication device of the secondary system simultaneously receives signals through a small number of frequency bands. Accordingly, the hardware cost of the communication device of the secondary system can be reduced.

<5.3. Processing Flow>

Figure 12:
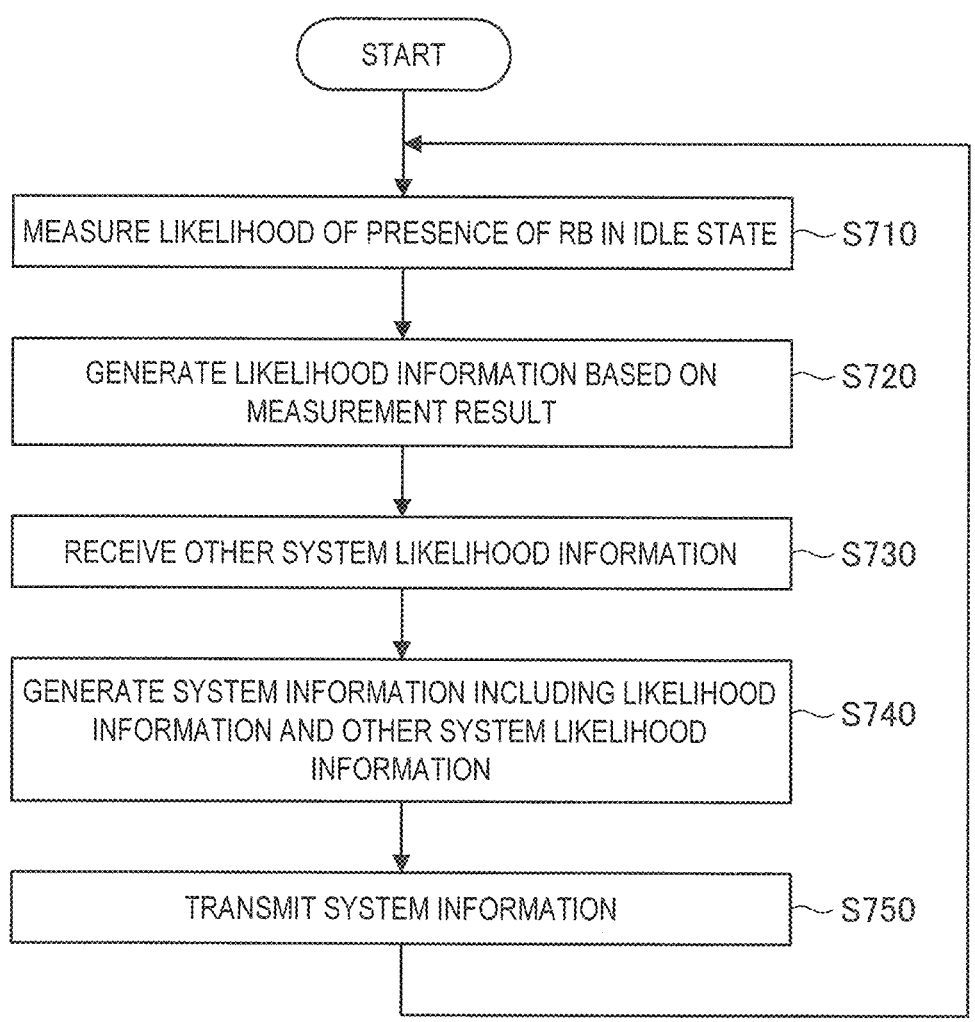
FIG. 12 is a flowchart illustrating an exemplary schematic flow of a communication control process of an eNodeB side of a primary system according to a modified example of the present embodiment.

Next, an exemplary communication control process according to the modified example of the present embodiment will be described with reference to FIGS. 12 and 13.

(Processing of eNodeB 100 of Primary System)

First, an exemplary communication control process of the eNodeB 100 side of the primary system according to the modified example of the present embodiment will be described with reference to FIG. 12. FIG. 12 is a flowchart illustrating an exemplary schematic flow of a communication control process of the eNodeB 100 side of the primary system according to a modified example of the present embodiment.

First, in step S710, the resource information generating unit 143 measures the likelihood that there will be communication resources in the idle state based on the utilization state of the communication resources of the primary system.

Then, in step S720, the resource information generating unit 143 generates the likelihood information for notifying of the likelihood based on the measurement result.

Then, in step S730, the system information generating unit 145 acquires the other system likelihood information for notifying the secondary system of the likelihood of the presence of the resource block of primary systems in the idle state through the network communication unit 120.

Then, in step S740, the system information generating unit 145 generates system information including the likelihood information and the other system likelihood information.

Thereafter, in step S750, the radio communication unit 110 transmits the system information including the likelihood information and the other system likelihood information.

(Processing of Home eNodeB 300 of Secondary System)

Next, an exemplary communication control process of the home eNodeB 300 side of the secondary system according to the modified example of the present embodiment will be described with reference to FIG. 13. FIG. 13 is a flowchart illustrating an exemplary schematic flow of a communication control process of the home eNodeB 300 side of the secondary system according to a modified example of the present embodiment.

First, in step S810, the radio communication unit 310 receives the system information of the frequency band of the primary system.

Then, in step S820, the control unit 340 acquires the system information, and acquires the likelihood information included in the system information and the other system likelihood information.

Then, in step S830, the control unit 340 measures the reception power of the eNodeB of each primary system.

Then, in step S840, the control unit 340 selects the frequency band (the primary system) based on the likelihood information, the other system likelihood information, and the measurement result of the reception power.

Thereafter, in step S850, the control unit 340 decides execution of decoding of the selected frequency band.

<<6. Conclusion>>

The respective devices and the communication control processes according to the embodiments of the present disclosure have been described so far with reference to FIGS. 1 to 13. According to the present embodiment, the eNodeB 100 of the primary system generates the resource information for notifying the secondary system of available communication resources, and transmits the resource information through the downlink control channel including the common space and the plurality of individual spaces. Thus, the communication device of the secondary system can check the communication resources in the idle state based on the resource information. Thus, the communication device of the secondary system need not check all the scheduling information of the downlink control channel. As a result, the load of the communication device of the secondary system is reduced.

Further, for example, the downlink control channel includes a common space, a plurality of individual spaces, and a secondary system space having the same format as the individual space. Further, the eNodeB 100 of the primary system transmits the resource information using the secondary system space. Thus, the communication device of the secondary system need not perform processing using various IDs, and thus processing of the UE 200 of the primary system is not increased. In other words, the load of the UE of the primary system is not increased, and the load of the communication device of the secondary system is reduced. Further, backward compatibility with the existing system can be secured.

Further, for example, the secondary system space is positioned ahead of all or some of the plurality of individual spaces in the time direction in the downlink control channel. Thus, since the secondary system space can be decoded early, a preparation time necessary for the secondary system to use the communication resources can be further increased.

Further, for example, the resource information includes the information for notifying the secondary system of the available uplink communication resources of the primary system. Thus, the load of the communication device of the secondary system that desires to check the communication resources in the idle state can be particularly reduced.

Further, for example, the resource information includes the identification information uniquely identifying the available communication resources among a plurality of devices. Thus, a plurality of communication devices of the secondary system can adjust which communication device uses which communication resources. Thus, as the plurality of communication devices simultaneously use the communication resources in the idle state, the occurrence of a collision can be prevented. Further, since the adjustment can be performed between the secondary systems, the load of the primary system is not increased.

Further, for example, the eNodeB 100 of the primary system generates the likelihood information for notifying the secondary system of the likelihood of the presence of available communication resources, and transmits the system information including the likelihood information. Thus, the communication device of the secondary system determines whether or not there are likely to be communication resources in the idle state based on the system information before the decoding of the downlink control channel. Then, when there are likely to be communication resources in the idle state, the communication device performs the decoding of the downlink control channel, but otherwise, the communication device does not perform the decoding of the downlink control channel. Thus, since the decoding of the downlink control channel is minimized, the load of the communication device of the secondary system can be further reduced.

Further, for example, the system information includes the likelihood information and other likelihood information for notifying the secondary system of the likelihood of the presence of available communication resources of the other primary systems. As described above, as the likelihood information of the other primary systems is also included in the system information, the hardware cost of the communication device of the secondary system can be reduced. More specifically, when the secondary system is configured to simultaneously receive signals from a plurality of eNodeBs through different frequency bands, the hardware cost increases. Thus, as the likelihood information of a plurality of primary systems is transmitted from one primary system, the secondary system simultaneously receive signals from a small number of eNodeBs through a small number of frequency bands. Thus, the hardware cost of the communication device of the secondary system can be reduced.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the secondary system including the home eNodeB and the UE has been described as an example, but the secondary system according to the present disclosure is not limited to this example. The secondary system may be a radio communication system including any other communication device. For example, the secondary system may be any other radio communication system including any base station (or access point) and any terminal apparatus. Further, for example, the secondary system may include a plurality of terminal apparatuses, and the plurality of terminal apparatuses may perform direct communication with one another. Such direct communication is called device to device communication (D2D), and is attracting public attention as a new future cellular technique.

Further, the example in which the communication resources of one frequency band of the primary system are mainly released has been described, but the technique according to the present disclosure is not limited to this example. Communication resources of each of a plurality of frequency bands of the primary system may be released. In this case, for example, the processing of the above embodiments is executed for each frequency band.

Further, the communication resources in the idle state have been described to be communication resources usable by the secondary system, but the technique according to the present disclosure is not limited to this example. Some communication resources among the communication resources in the idle state may be selected as communication resources usable by the secondary system.

Processing steps in the various communication control in the present description do not necessarily have to be performed in the chronological order described in the flowcharts. For example, the processing steps in the various communication control may be performed in order different from the order described as the flowcharts, or may be performed in parallel.

It is possible to produce a computer program for causing hardware such as a CPU, ROM, and RAM built in a communication control apparatus or communication apparatus to execute a function corresponding to each configuration of the communication control apparatus or the communication apparatus. There is also provided a storage medium having the computer program stored therein.

Additionally, the present technology may also be configured as below.

(1)

A communication control device including:

a radio communication unit configured to perform radio communication with a plurality of terminal apparatuses of a primary system using communication resources of the primary system; and a generating unit configured to generate resource information for notifying a secondary system secondarily using the communication resources of available communication resources, wherein the radio communication unit transmits the resource information generated by the generating unit through a downlink control channel including a common space that is decoded in common by the plurality of terminal apparatuses and a plurality of individual spaces that are decoded by only some of the plurality of terminal apparatuses.

(2) The communication control device according to (1), wherein the downlink control channel includes the common space, the plurality of individual spaces, and a secondary system space having the same format as the individual space, and
wherein the radio communication unit transmits the resource information using the secondary system space.

(3) The communication control device according to (2), wherein the secondary system space is positioned ahead of all or some of the plurality of individual spaces in a time direction in the downlink control channel.

(4) The communication control device according to any one of (1) to (3),
wherein the resource information includes information for notifying the secondary system of available uplink communication resources of the primary system.

(5) The communication control device according to any one of (1) to (4),
wherein the resource information includes identification information uniquely identifying the available communication resources among a plurality of devices.

(6) The communication control device according to any one of (1) to (5),
wherein the generating unit generates likelihood information for notifying the secondary system of a likelihood of presence of the available communication resources, and
wherein the radio communication unit transmits system information of a frequency band of the primary system, the system information including the generated likelihood information.

(7) The communication control device according to (6), wherein the system information includes the likelihood information and other likelihood information for notifying the secondary system of a likelihood of presence of available communication resources of other primary systems.

(8) A communication control method including:
performing radio communication with a plurality of terminal apparatuses of a primary system using communication resources of the primary system;
generating resource information for notifying a secondary system secondarily using the communication resources of available communication resources; and
transmitting the generated resource information through a downlink control channel including a common space that is decoded in common by the plurality of terminal apparatuses and a plurality of individual spaces that are decoded by only some of the plurality of terminal apparatuses.

(9) A communication device including:
a radio communication unit configured to receive resource information for notifying a secondary system secondarily using communication resources of a primary system of available communication resources through a downlink control channel including a common space that is decoded in common by a plurality of terminal apparatuses of the primary system and a plurality of individual spaces that are decoded by only some of the plurality of terminal apparatuses; and
a control unit configured to cause the radio communication unit to perform radio communication using the available communication resources based on the resource information acquired by decoding of the downlink control channel.

REFERENCE SIGNS LIST 10 cell of primary system
30 cell of secondary system
100 eNodeB
110 radio communication unit
120 network communication unit
130 storage unit
140 control unit
141 scheduling unit
143 resource information generating unit
145 system information generating unit
200 UE
300 home eNodeB
310 radio communication unit
320 network communication unit
330 storage unit
340 control unit
400 UE

The invention claimed is:

1. A communication control device comprising:
circuitry configured to:
perform radio communication with one or more apparatuses using communication resources of a first system of a first operator;
generate first information for notifying a terminal device in a second system of available communication resources of the first system for use in device-to-device communication between the terminal device and another terminal device in the second system without using a base station, and second information for notifying the terminal device of the second system of information about available communication resources of another first system of a second operator for use in device-to-device communication between the terminal device and the another terminal device in the second system without using a base station; and
transmit the first information and the second information;
wherein the second information is transmitted using a frequency band of the first system.

2. The communication control device according to claim 1, wherein the circuitry is further configured to generate and transmit information indicating a number of available resource blocks of the first system.

3. The communication control device according to claim 2, wherein the number of available resource blocks is more than two resource blocks.

4. The communication control device according to claim 2, wherein the number of available resource blocks is transmitted in a downlink control channel.

5. The communication control device according to claim 1, wherein the circuitry is further configured to generate and transmit position information indicating a position of at least one available resource block in the time domain and the frequency domain, respectively.

6. The communication control device according to claim 1, wherein the circuitry is further configured to generate and transmit information indicating at least one of a resource block number, a subframe number, and a system frame number of at least one available resource block.

7. The communication control device according to claim 1, wherein the first information is transmitted through a downlink control channel.

8. The communication control device according to claim 7, wherein the first information is transmitted through the downlink control channel including a common space having content that is decoded by each of a plurality of apparatuses and a plurality of individual spaces that are decoded by one of the plurality of apparatuses.

9. The communication control device according to claim 1, wherein the first information includes information for notifying the terminal device of the second system of available uplink communication resources of the first system.

10. A communication method, comprising
performing radio communication with one or more apparatuses using communication resources of a first system of a first operator;
generating first information for notifying a terminal device in a second system of available communication resources of the first system for use in device-to-device communication between the terminal device and another terminal device in the second system without using a base station, and second information for notifying the terminal device in the second system of information about available communication resources of another first system of a second operator for use in device-to-device communication between the terminal device and the another terminal device in the second system without using a base station; and
transmitting the first information and the second information,
wherein the second information is transmitted using a frequency band of the first system.

11. A non-transitory computer-readable storage medium encoded with a plurality of instructions that, when executed by processing circuitry, perform a method, the method comprising:
performing radio communication with one or more apparatuses using communication resources of a first system of a first operator;
generating first information for notifying a terminal device in a second system of available communication resources of the first system for use in device-to-device communication between the terminal device and another terminal device in the second system without using a base station, and second information for notifying the terminal device in the second system of information about available communication resources of another first system of a second operator for use in device-to-device communication between the terminal device and the another terminal device in the second system without using a base station; and
transmitting the first information and the second information,
wherein the second information is transmitted using a frequency band of the first system.

12. A communication device comprising:
circuitry configured to:
receive first information notifying a terminal device in a second system of available communication resources of a first system of a first operator for use in device-to-device communication between the terminal device and another terminal device in the second system without using a base station, and second information notifying the terminal device in the second system of information about available communication resources of another first system of a second operator for use in device-to-device communication between the terminal device and the another terminal device in the second system without using a base station; and
schedule the available communication resources of the first system or the another first system and perform the device-to-device communication with another terminal device in the second system using the available communication resources of the first system or the another first system,
wherein the second information is received using a frequency band of the first system.

13. The communication device according to claim 12, wherein the circuitry is further configured to receive the first information through a downlink control channel.

14. The communication device according to claim 13, wherein the circuitry is further configured to receive the first information through the downlink control channel including a common space having content that is decoded by each of a plurality of terminals apparatuses and a plurality of individual spaces that are decoded by one of the plurality of terminal apparatuses.

15. The communication device according to any of claims 13, wherein the circuitry is further configured to decide execution of decoding of the downlink control channel based on the first information and the second information.

16. A communication method, comprising:
receiving first information notifying a terminal device in a second system of available communication resources of a first system of a first operator for use in device-to-device communication between the terminal device and another terminal device in the second system without using a base station, and second information notifying the terminal device in the second system of information about available communication resources of another first system of a second operator for use in device-to-device communication between the terminal device and the another terminal device in the second system without using a base station; and
scheduling the available communication resources of the first system or the another first system and perform the device-to-device communication with another terminal device in the second system using the available communication resources of the first system or the another first system,
wherein the second information is received using a frequency band of the first system.

17. A non-transitory computer-readable storage medium encoded with a plurality of instructions that, when executed by processing circuitry, perform a method, the method comprising:
receiving first information notifying a terminal device in a second system of available communication resources of a first system of a first operator for use in device-to-device communication between the terminal device and another terminal device in the second system without using a base station, and second information notifying the terminal device in the second system of information about available communication resources of another first system of a second operator for use in device-to-device communication between the terminal device and the another terminal device in the second system without using a base station; and scheduling the available communication resources of the first system or the another first system and perform the device-to-device communication with another terminal device in the second system using the available communication resources of the first system or the another first system, wherein the second information is received using a frequency band of the first system.

\* \* \* \* \*